Figure 1:
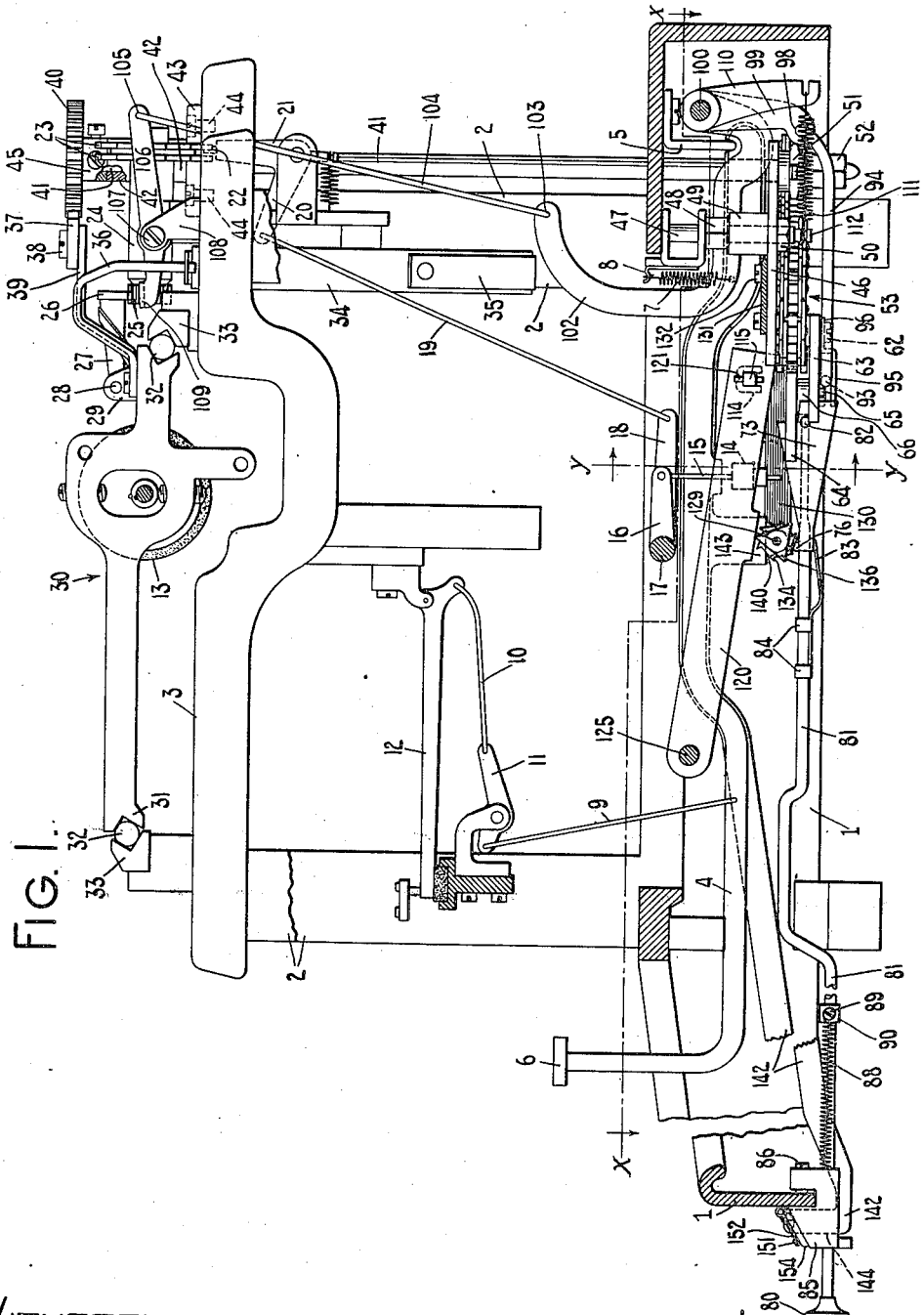

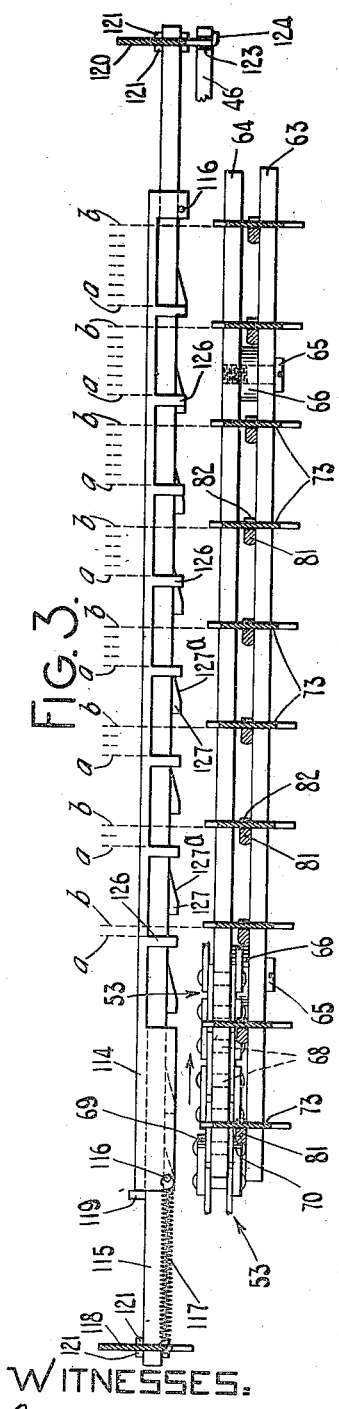
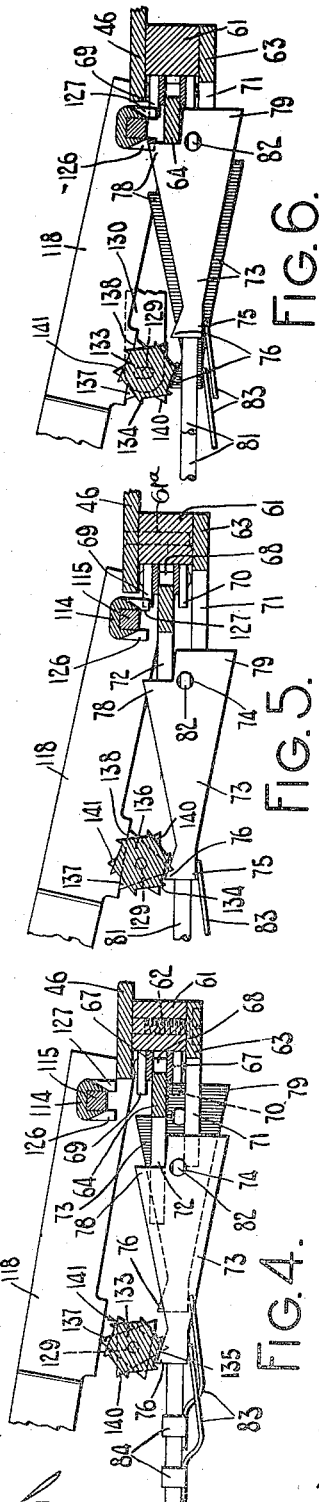
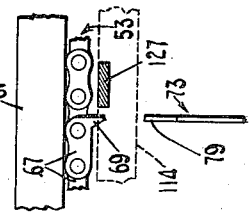
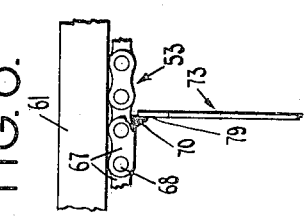
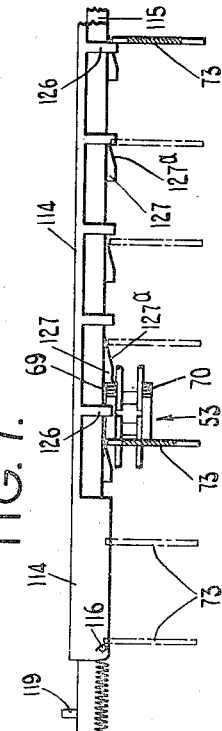
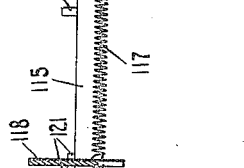

A. W. SMITH.
TYPE WRITING MACHINE.
APPLICATION FILED FEB. 11, 1913.
1,147,902.
Patented July 27, 1915.
4 SHEETS—SHEET 4.
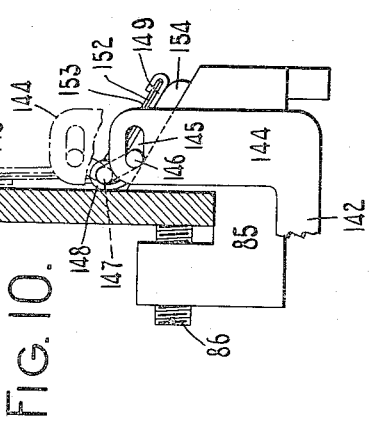
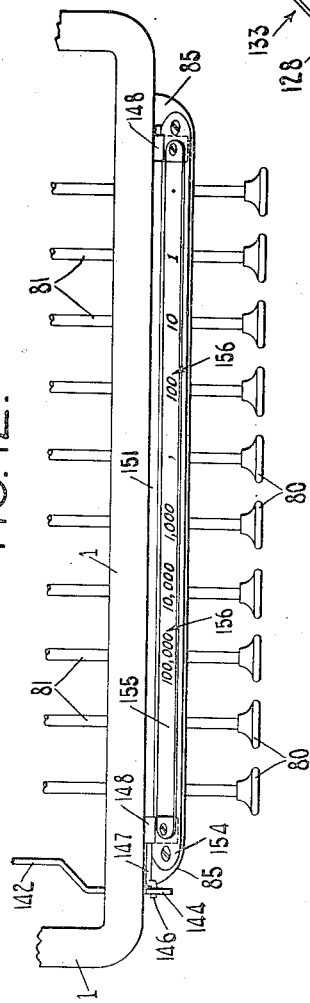
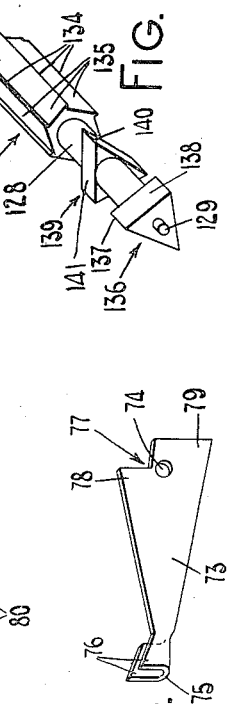
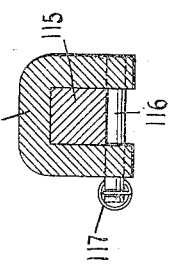
WITNESSES:
INVENTOR:
Arthur W. Smith
By Jacob Felbel
HIS ATTORNEY

UNITED STATES PATENT OFFICE.

ARTHUR W. SMITH, OF NEW YORK, N. Y., ASSIGNOR, BY MESNE ASSIGNMENTS, TO REMINGTON TYPEWRITER COMPANY, OF ILION, NEW YORK, A CORPORATION OF NEW YORK.

TYPE-WRITING MACHINE.

1,147,902.      Specification of Letters Patent.      Patented July 27, 1915.

Application filed February 11, 1913. Serial No. 747,604.

*To all whom it may concern:*

Be it known that I, ARTHUR W. SMITH, citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to tabulating mechanism.

The invention, from certain aspects, may be said to be in the nature of an improvement on the construction disclosed in my application, Serial No. 730,350, filed November 9th, 1912.

The objects of the invention, generally stated, may be said to be as follows:—(1st) to provide an improved combined denominational and column selecting mechanism which is comparatively simple in construction and is reliable and efficient in use; (2nd) to provide improvements by which the tabulating mechanism in the ordinary operation thereof is necessarily operable alternately as a column selector and as a denominational selector; (3rd) to provide means by which the same tabulator keys in the ordinary operation thereof are necessarily operable alternately for column selection and for denominational selection; (4th) to provide automatically operating means controlled by the tabulator keys for rendering the keys operative at one time as column selecting keys and at another time as denominational selecting keys; (5th) to provide a series of independently operable tabulator stops and automatically operating means by which the same stops are rendered operative at one time as column selecting stops and at another time as denominational selecting stops; (6th) to provide improved tabulator mechanism comprising a member which has a limited movement and may be connected to move in unison with the carriage or freed from operative connection with the carriage to enable the latter to move independently of said member, together with key controlled means for variably arresting said member to control the position of arrest of the carriage as determined by the extent of movement of said member in unison with the carriage; (7th) to provide improved automatically actuated tabulator indicating means; (8th) to provide automatically operating indicating means for exposing different characters of tabulating indices at alternate actuations of the tabulator mechanism; (9th) to provide key controlled means for shifting a tabulator index; (10th) to provide means by which the tabulating indicating means may be automatically shifted or may be shifted at will, as may be desired; (11th) to so construct any and all of the above mentioned means that they may be readily embodied in existing forms of typewriting machines without changing, or materially changing, the structural features of said machines as they now exist.

To the above and other ends which will hereinafter appear, my invention consists in the features of construction, arrangements of parts and combinations of devices to be set forth in the following description and particularly pointed out in the appended claims.

Figure 2:
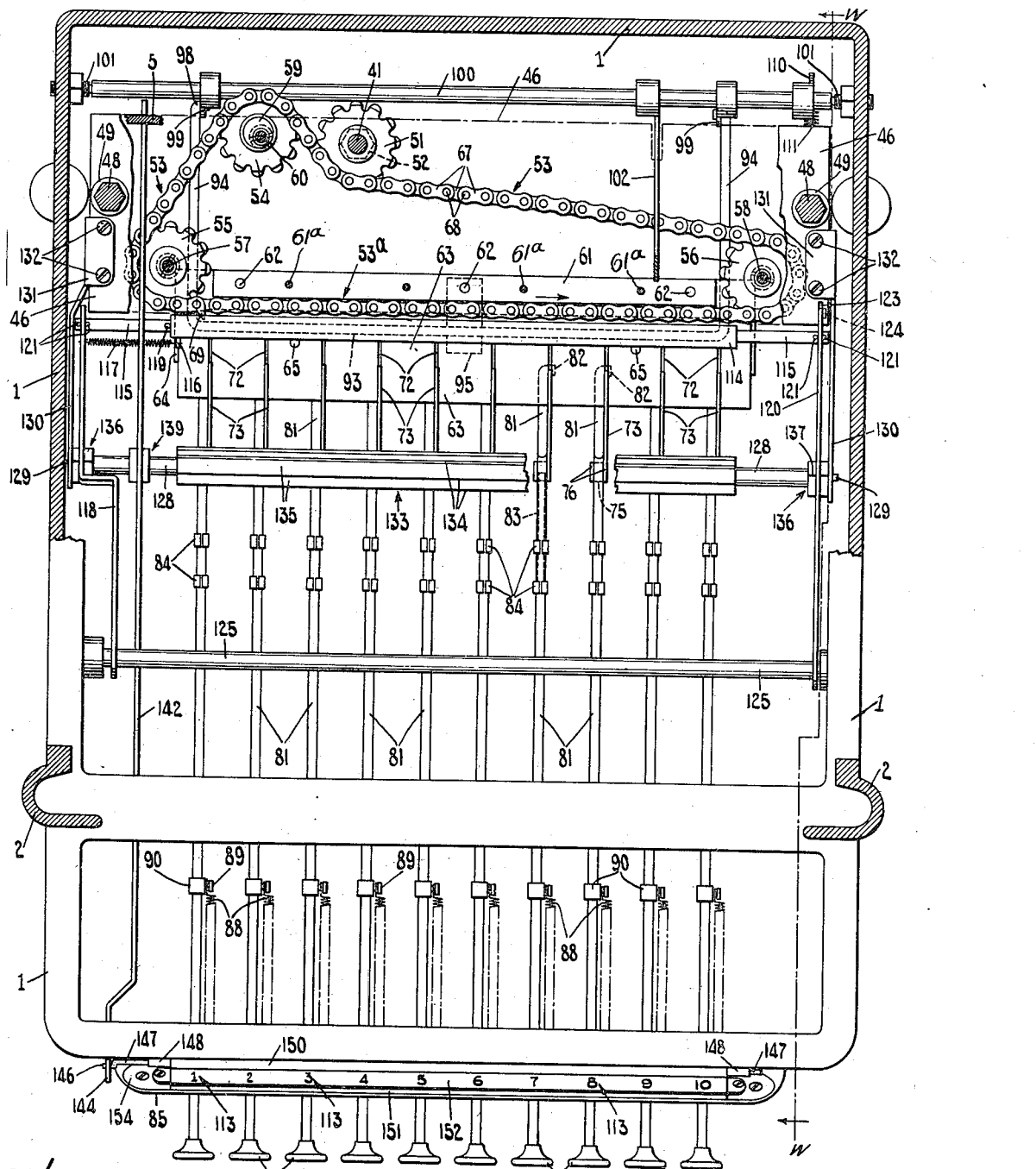

In the accompanying drawings in which like reference characters designate like parts in the various views, Figure 1 is a fragmentary side view, partly in section, of a typewriting machine embodying my invention, the sectioning of the parts at the base of the machine being taken on a line $w$—$w$ in Fig. 2 and looking in the direction of the arrows at said line. Fig. 2 is a fragmentary horizontal sectional view of the same taken on the line $x$—$x$ of Fig. 1 and looking in the direction of the arrows at said line. Fig. 3 is a detail fragmentary vertical transverse sectional view, with parts omitted, the section being taken on the line $y$—$y$ of Fig. 1 and looking in the direction of the arrows at said line, the view disclosing parts of the tabulator mechanism shown full size. Figs. 4, 5 and 6 are fragmentary vertical fore and aft sectional views, taken transversely, of the parts shown in Fig. 3, Figs. 4, 5 and 6 showing the parts full size and differently disposed as they appear under different conditions of operation. Fig. 7 is a fragmentary view corresponding to Fig. 3, with some of the parts omitted but illustrating a different disposition of the parts from that indicated in Fig. 3. Figs. 8 and 9 are detail fragmentary plan views showing full size some of the parts illustrated in Figs. 3 to 7. Fig. 10 is an enlarged detail fragmentary end elevation, with parts in section, of the tabulator indicating devices and some of the associated parts. Fig. 11 is a vertical fore and aft sectional view of the same, the section extending transversely of the tabulator index plates. Fig. 12 is a detail fragmentary plan view of the same, the view being taken on a smaller scale than Figs. 10 and 11. Fig. 13 is a detail perspective view of one of the key controlled tabulator stops. Fig. 14 is an enlarged detail transverse sectional view taken through the movable stop carrying bar and its carrier. Fig. 15 is a detail fragmentary perspective view of a portion of the automatically actuated controlling mechanism.

I have illustrated my invention in the present instance embodied in a No. 10 or No. 11 Remington machine with the ordinary tabulator mechanism omitted. I have only shown so much of the machine as may be necessary to arrive at an understanding of my invention in its embodiment therein. While the invention may be readily embodied in either of these machines without modifying, or materially modifying, the structural features of said machines as they now exist except for the omission of the tabulator mechanism ordinarily employed therein, it should be understood that the invention may be embodied in various styles of typewriting machines.

In the construction disclosed in my previous application hereinbefore referred to, the tabulator mechanism is operative at one time as a column selector and at another time as a denominational selector, depending on the position of the carriage in its travel from side to side of the machine, the travel of the carriage automatically determining whether the mechanism is operative for column selection or for denominational selection.

In the present construction I have provided means under control of the tabulator keys for automatically controlling the tabulator mechanism to render said mechanism alternatively operative as a column selector and a denominational selector and have also provided means under control of the tabulator keys for alternately exposing first one and then another of two series of tabulator indices in register with the tabulator keys, accordingly as they are operative for column or denominational selection.

The frame of the machine comprises a base 1, corner posts 2 and a top plate 3. The type actions are of the usual construction, each comprising a key lever 4 fulcrumed on a fulcrum bar 5 secured to the base of the machine and having a finger key 6 at the keyboard of the machine. Each key lever 4 is connected to a returning spring 7 attached at one end to the key lever and at its opposite end to a hook 8 fixed to the base of the machine. Links 9 and 10 and a sub-lever 11 are interposed between each key lever and its associated type bar 12, the latter being pivoted to swing upwardly and rearwardly against the front face of a rotative platen 13. A universal bar 14 extends transversely beneath the key levers 4 and is connected at its ends to upwardly extending links 15 which in turn are connected to crank arms 16 that project rearwardly from a rock shaft 17 mounted at its ends in the base of the machine. A centrally disposed rearwardly extending arm 18 also extends from said rock shaft and is connected at its rear end to an upwardly extending link 19. This link in turn is connected to a forwardly projecting arm 20 of a dog rocker 21 which carries a feed dog 22 coöperative with a double escapement wheel 23. This escapement wheel is carried at the rear end of a shaft which rotates in a bearing 24 fixed to the top plate of the machine. The forward end of the escapement wheel shaft carries a feed pinion 25 with which a feed rack 26 is adapted to mesh. This feed rack is carried by rearwardly extending arms 27 pivoted at 28 to upwardly extending lugs 29 on a carriage, which latter is designated as a whole by the reference numeral 30. The carriage is formed with oppositely grooved guide rails or guide ways 31 in which anti-friction balls or rollers 32 are received. These anti-friction balls or rollers are also received in oppositely grooved fixed guide rails 33 supported on the top plate of the machine. The rotative platen 13 is supported in the carriage in the usual manner. A spring drum 34 is connected by a band 35 to a bracket arm 36 secured to the carriage at the right-hand end portion thereof. This spring is effective to propel the carriage from right to left, or in the direction of its feed under the control of the escapement mechanism.

The parts thus far described constitute portions of the No. 10 or No. 11 Remington machine and further description thereof is deemed unnecessary.

A rack bar 37 is fixed by screws 38 to rearwardly extending bracket arms 39 secured to and projecting rearwardly from the carriage. The rack 37 extends throughout, or substantially throughout, the length of the carriage and meshes with a gear 40. This gear is fixed to the upper end of a driving shaft 41 which extends through bearing openings in the top plate and in the base of the machine. The upper end portion of the shaft also extends through a bearing member 42 formed with a flange 43 secured to the top plate of the machine by screws 44. The hub 45 of the gear wheel bears against the upper end of the bearing member 42 to support the gear wheel and shaft in position. The lower end of the driving shaft 41 extends through a bearing opening in a supporting plate 46 which is fixed to the base of the machine in any suitable manner.

Thus in the present instance I have secured the supporting plate 46 in place by screws 47 which are received in tapped openings in the base of the machine and are each provided with a hexagonal portion 48 by which the screw may be threaded into its opening.

A spacing sleeve or collar 49 is interposed between the upper face of the supporting plate 46 and the associated hexagonal portion 48 of each screw.

A nut 50 is threaded onto each screw 47 below the supporting plate 46 to support the plate in position. This manner of supporting a plate 46 in position is the same as is disclosed in my previous application hereinbefore referred to and further description thereof is deemed unnecessary. The lower end of the driving shaft 41 where it extends beneath the supporting plate 46 is provided with a driving sprocket wheel 51 detachably secured to the shaft by a nut 52 threaded onto the lower end of the shaft to couple the driving wheel and the shaft in the same manner as is disclosed in my previous application referred to above. The sprocket wheel 51 engages an endless driving band or sprocket chain 53 which passes around and engages idler sprocket wheels 54, 55 and 56. A headed shoulder screw 57 constitutes a support and pivot for the sprocket wheel 55, the threaded end of the screw being received in a tapped opening in the supporting plate 46. A like pivot screw 58 constitutes a support and pivot for the sprocket wheel 56. The sprocket wheel 54 receives a bearing on an eccentric 59 through which a headed bearing screw 60 passes. The threaded end of this screw is received in a tapped opening in the plate 46, the eccentric being clamped between the head of the screw and the plate to secure the eccentric in any one of the different rotative positions to which it may be adjusted. This construction is similar to the corresponding construction disclosed in my previous application and is for the purpose of taking up any undue slack in the sprocket chain. It will be seen that the relative disposition of the three sprocket wheels 51, 54 and 56 is effective to maintain the sprocket chain in effective engagement with the driving sprocket wheel 51 as well as with the sprocket wheels 54 and 56.

The straight length of chain which extends between the sprocket wheels 55 and 56, and which is indicated at 53ª, is guided in its movement from one of these sprocket wheels 55, 56 to the other in the following manner. The upper side of the chain is adapted to bear against the body portion of the supporting plate 46, as indicated in Figs. 4, 5 and 6. A bar 61 is secured to the lower face of the supporting plate 46, as shown for example in Figs. 2 and 5, by means of rivets 61ª. The forward edge of the bar 61 constitutes a guide and supporting face for the inner edge of the straight length of chain 53ª in the movement of the chain from one of the sprocket wheels 55, 56 to the other. A lower guide plate 63 is arranged parallel with the supporting plate 46 and is connected thereto by the screws 62. The chain is thus confined between the lower and upper faces of the plates 46 and 63 respectively to guide and maintain the chain against lateral deflection in its movement from one of the sprocket wheels 55, 56 to the other. In addition to the means thus far described for guiding the sprocket chain, I have provided a guide plate 64 which is fixedly connected to the guide plate 63 by screws 65, spacing sleeves or washers 66 being interposed between the plates 64 and 63. The rear edge of the guide bar 64 is received between the links 67 of the sprocket chain and is adapted to bear against pivots 68 which unite the links, as shown more clearly in Figs. 4, 5 and 6. The plate 64 is therefore effective to prevent the chain from buckling when the stops engage and from moving forward in the guide formed by the members 64, 63, 61 and 46, the chain being guided on four sides by these members in the passage of the chain from one of the sprocket wheels 55, 56 to the other. One of the links 67 is formed with an outwardly extending projection 69 that constitutes a stop, as will hereinafter more clearly appear. The companion link 67 on the other side of the chain is also formed with a corresponding projection 70 which likewise constitutes a stop. These two stops, therefore, are arranged to travel side by side with the working faces thereof in the same plane, although the two stops have different paths of movement with the chain, the path of movement of one stop being above and parallel with that of the other. It will be understood from the foregoing description that the chain 53 is connected to move in unison with the carriage and that the stops 69 and 70 are likewise connected to move in unison with the carriage, although the stops 69 and 70 move in the direction of the arrow in Fig. 2, or from left to right, between the sprocket wheels 55 and 56 as the carriage moves from right to left or in the direction of its feed. In the present instance the gearing between the carriage and the sprocket chain is as four to three, so that the stops 69 and 70 move at a slightly slower rate of speed than the carriage. This, however, may be varied to suit the conditions presented, as pointed out in my previous application.

I have provided a series of key controlled tabulator stops for coöperation with the traveling chain driven stop 70. Thus it will be seen that these parallel guide plates 63 and 64 are provided with registering slots 71, 72, respectively, which extend fore and aft of the machine from the edges of the guide plates in which they are formed. Plate-like sheet metal stops 73 are received in these slots.

In the present instance I have shown ten stops 73, all of which are similar in construction and are received and guided in their movements fore and aft of the machine in the guide slots 71 and 72. These stops 73 are preferably formed, as indicated in detail in Fig. 13, with an opening 74, which extends transversely through the stop, and also with a substantially U-shaped bearing portion 75 at the forward end portion of the stop. The upper end of the U-shaped member on each stop form engaging noses or pawls 76, for purposes which will hereinafter appear. The rear end of each stop 73 is cut out, as at 77, and is formed with an engaging portion 78 for coöperation with a stop 126 and with an engaging portion 79 for coöperation with the traveling stop 70. A tabulator push key 80 is connected to each stop 73 by a push rod 81 which extends rearwardly from its key and is received in the U-shaped member 75 of the associated stop 73. The rear end of each push rod 81 is turned at substantially a right angle to the length of the rod, as indicated at 82. This bent end of the rod projects through the bearing opening 74 in the associated stop and constitutes a connecting means by which the stop is connected to move fore and aft of the machine with the stop rod, but by which connection a slight pivotal movement may be given each stop 73 around the associated bent end 82 as a pivot, for purposes which will presently appear. Each push rod 81 carries a leaf spring 83 which bears at its rear free end upwardly against the forward end portion 75 of the associated stop 73, to maintain it normally seated against its push rod 81. Each leaf spring 83 is preferably formed at its attaching end with encircling bands or clamps 84, which partly surround the associated push rod 81 to secure the leaf spring to the rod. The forward ends of the push rods extend through guide openings in a member 85 which is secured by screws 86 to the base of the machine at the forward end thereof. The member 85 is in the nature of a casting provided with a perforated flange 87 (see Fig. 11) to which the forward ends of contractile returning springs 88 are connected. The rear ends of these springs are connected to screws 89 threaded into collars 90 which surround the rods 81 and are maintained in their adjusted positions along the rod by the set screws 89 bearing at their inner ends against the rods 81. Each rod 81 also carries a sleeve 91 (Fig. 11) which is adjustably secured thereto by a set screw 92. Each sleeve 91 constitutes an adjustable abutment which co-acts with the casting 85 to limit the forward movement of the associated stop rod 81 and the parts controlled thereby. From an inspection of Figs. 1 and 2 it will be observed that the bent ends 82 of the stop rods are received between the guide plates 63 and 64 and extend crosswise of the slots 71 and 72 respectively therein. These bent ends 82 therefore co-act with the plate 64 to support the rear ends of the stop rods 81 and the stops 73 carried thereby but afford a fore and aft movement of the stops in the guide slots of the plates 63 and 64 and also afford a slight pivotal movement of the stops, as hereinbefore explained.

A universal bar 93 extends beneath the guide plate 64 and is provided at its ends with rearwardly extending arms 94. Beneath the universal bar is a bracket arm 95 which extends parallel with the lower face of the guide plate 64 and has a foot piece 96 which bears against the guide plate 64 and is secured thereto by one of the screws 62. The bracket 95 is therefore fixed to the plate 64 and constitutes a support for the universal bar 93 and by which it is guided and supported in its movement fore and aft of the machine. The rearwardly projecting arms 94 of the universal bar are pivotally connected at 98 with depending crank arms 99 which project from a rock shaft 100. This rock shaft is supported at its ends by bearing screws 101 received in tapped openings in the base of the machine. A crank arm 102 which extends downwardly and then forwardly and then upwardly and rearwardly from the rock shaft 100 is connected at 103 to a link 104. The upper end of this link is pivoted at one end 105 to a lever-like carriage releasing device 106 which is pivoted at 107 to a bracket 108 secured to the top plate of the machine. The forward end of the releasing device is provided with an off-set shoe 109 which extends beneath the feed rack 26. The rock shaft 100 is also provided with a depending crank arm 110 to which one end of a contractile spring 111 is fixed, the opposite end of said spring being connected to the extending end 112 of the right-hand screw 47 by which the supporting plate 46 is held in place. The power of the spring 111 is exerted to turn the rock shaft 100 and move the carriage releasing device to normal position, as shown in Fig. 1. From an inspection of this figure it will be understood that each key controlled stop 73, where it extends beneath the guide plate 63, is adapted to engage the universal bar 93 in the rearward movement of the stop. The effect of this is to move the universal bar rearwardly, thereby rocking the shaft 100 and actuating the carriage releasing device 106 to elevate the rack 26, thereby releasing the carriage from control of its escapement mechanism. This same rearward movement of a key controlled stop is effective as hereinbefore pointed out to bring the engaging portion 79 on the projected stop into the path of the chain driven stop 70 while the engaging portion 78 on the projected stop is maintained out of the path of traveling chain driven stop or engaging device 69, as will be clearly understood from an inspection of Fig. 4.

From the foregoing description it will be understood that pressure exerted against any of the tabulator keys 80 is effective to move the corresponding stop 73 into the path of the chain driven stop 70 and to simultaneously effect a release of the carriage. The carriage being freed from the control of its escapement mechanism will be propelled from right to left, under the action of its spring drum, until the chain driven stop 70 co-acts with the projected stop 73 to arrest the carriage in the columnar position determined by the particular stop 73 which has been moved to operative position. When pressure on the actuated tabulator key is released the projected stop 73 will return to normal position and the carriage will be restored to control of the escapement mechanism.

It will be seen that the ten key controlled stops 73 are arranged at unvariable distances apart, which in the present instance we will assume corresponds to ten letter spaces of the carriage. It follows, therefore, that throughout the travel of the carriage from side to side of the machine any one of ten columnar fields, each occupying ten letter space positions, may be selected at will by the actuation of the tabulator keys 80, which at this time constitute column selecting keys.

From an inspection of Fig. 2 it will be seen that a series of tabulator indices 113 are provided, which indices are adapted to register with the tabulator keys 80 to aid the operator in selecting the column. It will be seen that these indices read progressively from left to right in their natural order of the columns on the paper. This is due to the fact that the chain driven stop 70 in co-acting with the key controlled stop 73 for column selection moves from left to right during the movement of the carriage from right to left.

I have provided means whereby when a column selection is made the tabulator mechanism will be automatically controlled so that the next actuation of a tabulator key 80 is effective to select a denominational position of arrest within the selected columnar field. Thus a bar, member or carrier 114, which is substantially U-shaped in cross section, as will be seen upon reference to Fig. 14, is mounted to straddle a supporting bar 115 which is rectangular in cross section. Pins 116 extend across the opening formed by the U-shaped member and are arranged beneath the supporting bar 115 to prevent an upward displacement of the bar 114 from its supporting bar and to afford a longitudinal movement of the member 115 on the supporting bar. One of these pins 116 is extended beyond the outer side of the member 114 and forms means by which a contractile spring 117 may be connected therewith, the opposite end of this spring being connected to an arm 118 by which one end of the bar 115 is supported. A pin 119 which extends upwardly from the supporting bar 115 co-acts with and limits the movement of the member 114 to the left, as the parts appear in Fig. 3. The opposite end of the supporting bar 115 is supported by an arm 120. The connection between the supporting bar 115 and the arms 118 and 120 is effected by projecting the ends of the bar 115 through rectangular openings in the arms 118 and 120 and inserting pins 121 through transverse openings in the bar 115 on the inner and outer sides of both of the arms 118 and 120 so as to lock the bar 115 against longitudinal movement in the bearing openings in these arms. The arm 120 extends through an opening 123 in the fixed supporting plate 46 (see Fig. 3) to guide the arm 120 and the parts carried thereby. The lower edge of the arm 120 is turned at right angles to the plane thereof, as indicated at 124, where it abuts the lower face of the fixed supporting plate 46 to limit the upward movement of the arm 120 and the parts carried thereby. The arms 118 and 120 are pivoted at their forward ends on a pivot rod 125. The frame formed by the pivoted arms 118, 120 and the cross or supporting bar 115 is therefore mounted for swinging movement around the pivot rod 125. The purpose of this swinging movement of the supporting bar 115 is to bring about an operative connection between the member 114 and the chain driven stop or engaging device 69 when the supporting bar swings down to the position represented in Figs. 5 and 7, and to effect a disconnection between the member 114' and the chain driven stop 69 when the supporting bar 115 is in the normal or elevated position shown in Figs. 3 and 4.

The member 114 is in the nature of a stop carrying bar provided with a series of stops 126. These stops are spaced at equal distances apart throughout, or substantially throughout, the length of the stop bar 114. There is provision made in the present instance for writing in as many as seven denominational positions within any columnar field by the spacing between these stops 126, as will hereinafter appear. The bar is also provided with a series of engaging devices 127 which are uniformly spaced apart and correspond substantially to the spacing of the key controlled stops 73. It will be observed that each of these stops 127 has a rear beveled face 127ª for purposes which will be hereinafter explained. When the supporting bar 115 is in the lowermost position shown in Figs. 5 and 7, one of the engaging members 127 is in a position to be engaged by the chain driven stop 69 as the latter moves along with its chain from left to right in the direction of the arrow in Fig. 3. It will be observed that the engaging devices 127 and the stop 126 have two separate and distinct paths of movement longitudinally of the column stop bar. If, therefore, when the bar 114 is in the operative position and a key controlled stop 73 be projected rearwardly to the operative position, as shown in Fig. 6, the engaging portion 78 thereof will be brought into the path of one of the stops 126. The movement of the stop 73 to operative position was effective to release the carriage through the universal bar 93 in a manner hereinbefore explained. The released carriage is effective, therefore, to transmit movement through the gear 40, driving shaft 41, and driving sprocket 51 to the chain. The stop carrying bar 114 at this time being operatively connected to the chain will receive a limited movement to the right with the chain until the next adjacent stop 126 to the left of the projected stop 73 engages the latter and thus arrests the carriage in the proper denominational position determined by the particular tabulator key 80 which has been actuated. The effect of this operation is to transmit varying extents of movement to the stop carrying bar 114, depending on the particular key controlled stop 73 which has been projected to operative position. This variable movement of the stop carrying bar is due to the fact that there is a constantly varying relation between the stops 126 and the stops 73 with which they co-act. This is best illustrated in Fig. 3 from which it will be observed that the working face of the first of the series of stops 126, counting from left to right, and which working face is indicated by the dotted line $a$, is one unit of distance from the working face of the associated key controlled stop 73, the working face of the latter being indicated by the dotted line $b$. Comparing these lines for each successive pair of coöperative stops 73 and 126, it will be seen that they increase a unit of distance. Each unit of distance designated corresponds to a letter space position of the travel of the carriage. It will be understood, therefore, that the first pair of stops from the left co-act to afford a "drop" of the carriage a distance of one letter space; the next pair for two letter spaces; the next pair for three; the next for four; the next for five; the next for six; and the next for seven. The higher the denominational position the sooner the carriage is to be arrested in its travel. It follows, therefore, that at the selection of the highest denomination, or the one containing digits of the highest order, the least amount of drop of the carriage is effected. Therefore, the two co-acting stops 73 and 126 at the left-hand of the series determine the highest denominational position of arrest, whereas the two co-acting stops 73 and 126 at the right-hand of the series afford the longest extent of drop of the carriage for writing in the lowest denominational position, or at the decimal position.

I have provided means for automatically shifting the stop carrying bar 114 into and out of operative connection with the carriage, such mechanism being controlled by the operation of the tabulator keys. From an inspection of Figs. 1, 2 and 15, it will be observed that a rotative shaft 128 is provided with bearing pins 129 at its ends, such bearing pins being received in vertically disposed slotted openings in supporting arms 130. These arms are provided with ears 131 which are fastened by screws 132 to the supporting plate 46. The shaft 128 is thus supported for rotative movement and extends beneath the various key levers 4 and above the push rods 81 of the key controlled tabulator stops. The shaft 128 at that portion thereof which is arranged above the push rods 81 is formed as a rotative ratchet bar 133, six teeth 134 being formed by the ratchet bar. These teeth are so disposed that the pawls 76 on the key controlled stops are adapted to co-act therewith to rotate the ratchet bar during a forward movement of a stop out of operative position. Each actuation of a stop is effective to turn the ratchet bar one-sixth of a revolution. From an inspection of Figs. 1, 4, 5 and 6, it will be seen that the upper faces of the pawls 76 are so disposed that they co-act normally with a flat face 135 of the ratchet bar, while in the drawings pawls are shown out of coöperation with the co-acting flat face 135. This is so shown merely for the purpose of clearness of illustration and it should be understood that the pawls are normally in contact with one of these faces 135. Therefore the pawls 76 under the action of the springs 83 constitute detents which tend to prevent an accidental rotative movement of the ratchet bar when one of the stops 73 is shifted to operative position, as indicated in Fig. 6. During this rearward movement of a stop to operative position the stop may receive a slight pivotal movement around its pivot 82 and against the pressure of the associated spring 83. At this time the pawls 76 of the other stops 73 remain in normal position and tend to hold the ratchet bar against rotative movement with the actuated stop. It will be understood that after a stop has been moved rearwardly to operative position the pawls 76 carried thereby will be shifted to the rear of the lowermost engaging tooth 134 on the ratchet bar. The associated spring 83 tends to turn the actuated stop as the pawls 76 passes rearwardly of this tooth so that in the return movement of the stop said pawls will engage the lowermost tooth 134 and will effect a turning movement of the ratchet bar one step or one-sixth of a revolution. The purpose of this turning movement of the ratchet bar will presently appear. Each end of the rock shaft 128, which carries or is formed as a part of the ratchet bar 133, is formed with a cam 136, each of which cams is triangular in cross section (see Fig. 15). These cams, as will be understood from reference to Figs. 2, 4, 5 and 6, are arranged beneath the arms 118 and 120, the lower edges of the latter bearing against the faces of the cams 136 and being held in contact therewith by gravity, although one or more springs may be employed to insure proper downward movements of the arms 118 and 120 and the parts carried thereby. From an inspection of Fig. 4 it will be understood that when a corner 137 of each of the triangular cams is uppermost, as shown in this figure, the arms 118 and 120 will be maintained in the elevated position. At this time the stop carrying bar 114 is maintained uppermost and out of coöperative relation and operative connection with the chain driven stop 69. When, however, a flat face 138 of each cam 136 is presented for coöperation with the arms 118 and 120, as will be understood from an inspection of Fig. 5, these arms are in the lowermost position and the stop carrying bar 114 is maintained in its lowermost position where one of the engaging members 127 on the stop carrying bar will co-act with the traveling stop 69. At this time, therefore, a movement of the chain driven stop 69 is effective to carry the stop carrying bar with it a predetermined distance, or until the stop carrying bar is arrested through the coöperation of one of the stops 126 thereon with a key controlled stop 73 which has been projected to operative position.

Assume that the parts are in the normal position and that the operator desires to select a columnar position of arrest, and that this column is, say, the third column controlled by the third key 80, counting from left to right. The effect of an operation of this key is to move the third key controlled stop to operative position as shown in Fig. 4, where the engaging portion 79 thereof extends into the path of the traveling stop 70, and the same actuation of the key 80 is likewise effective to release the carriage. The carriage will move from right to left until the traveling stop 70 in its movement from left to right is arrested by the projected key controlled stop. During the return movement of the projected key controlled stop the pawls 76 thereon will engage the lowermost tooth 134 on the ratchet bar, turning the ratchet bar one-sixth of a revolution and bringing a flat face 138 on each of the cams 136 into position for coöperation with the arms 118 and 120, as shown in Fig. 5. The movement of the cams 136 thus effected brings about a lowering of the stop carrying bar 114 to the position shown in Figs. 5 and 7 where the third engaging member 127, counting from left to right, is interposed in the path of the chain driven stop 69. The effect of the operation of the third key for column selection work, therefore, is to automatically effect an operative connection between the carriage and the stop bar 114 to render the tabulator mechanism effective for denominational work. The operator, we will assume, next desires to secure the arrest of the carriage in the fourth or "100" denominational position. The operator will then push the seventh tabulator key, counting from the left, rearwardly, which key is designated in Fig. 12 by the index numeral "100". The effect of this is to project the associated key controlled stop 73 rearwardly to the operative position, as shown in Figs. 6 and 7 and to bring the engaging portion 78 on the key controlled stop into the path of the fifth stop 126, counting from left to right, on the stop carrying bar 114, at the same time effecting a release of the carriage. The stop carrying bar, which at this time is coupled up to move in unison with the carriage in the manner hereinbefore described, will travel from left to right until the fifth stop 126 co-acts with the projected stop 73 to effect an arrest of the carriage in the "100" denominational position in the third column, the columnar position having been selected by the previous actuation of the third key 80. In Fig. 7 I have shown in full lines the key controlled stop by which the third columnar position of arrest of the carriage was attained and have also shown in full lines the seventh key controlled stop and the positions that the parts assume at the instant the carriage is arrested in its "100" denominational position by the coöperation of the seventh key controlled stop with the co-acting stop 126 on the stop carrying bar.

In order to facilitate an understanding of the different operating views, it might be well to explain that Fig. 3 represents the parts as they appear in the normal position, with the stop carrying bar 114 out of operative connection with the carriage; that Figs. 4 and 8 show corresponding positions of the parts when a key controlled stop has been actuated for column selection; that Figs. 5 and 9 show corresponding positions of the parts when an actuated key has been released and the key returned to normal position after a column has been selected; and that Figs. 6 and 7 show corresponding positions of the parts when a key has been actuated for denominational selection and the carriage is arrested in its denominational position within a previously selected columnar field.

From the foregoing description it will be understood that the operation of the tabulator mechanism automatically renders the same keys and key controlled stops alternately effective as column selecting keys and stops and as denominational key and stops; that the tabulator keys themselves are effective to automatically bring about this change, by which the tabulator mechanism is alternately effective as a column selector and as a denominational selector; that when the key controlled stops 73 are operative as column selecting stops they co-act only with the traveling stop 70 connected with the carriage to move in unison therewith, whereas when the key controlled stops 73 are operative as denominational selecting stops, they co-act only with the stops 126 on the stop carrying bar 114, which latter at this time has been automatically coupled to move in unison with the carriage and is automatically uncoupled to enable the carriage to travel independently thereof as soon as the denominational position of arrest has been attained and the projected key controlled stop is returning to normal position.

In order that suitable tabulator indices may be employed for both column and denominational selection, I have provided means which are automatically actuated to expose one or another of two series of tabulator indices, accordingly as the mechanism is operated as a column selector or as a denominational selector. Upon reference to Figs. 2 and 15 it will be seen that the shaft 128 carries a cam 139 which, like the cams 136, is triangular in cross section but is disposed on the shaft differently from the cams 136 so that when a low portion or flat face 138 of each of the cams 136 is brought into action the high portion or apex 140 of the cam 139 is brought into action or is uppermost, as indicated in Figs. 1, 4 and 15. On the other hand, a flat face 141 of the cam 139 is presented uppermost when the high portions 137 of the cams 136 are presented uppermost, as will be understood upon reference to Fig. 4. From an inspection of Figs. 1 and 2, it will be seen that a lever 142 extends fore and aft of the machine and is fulcrumed at its rear end on the fulcrum bar 5 for the key levers 4. This lever has a depending projection 143 which coöperates with the cam 139. The forward end of this lever is bent upwardly beneath and forward of the base of the machine at 144, as shown in Figs. 10 and 12. The part 144 is slotted horizontally at 145 for the reception of a crank pin 146. This crank pin is formed at one end of a rock shaft 147 mounted to turn in bearings 148 supported on the member 85, which is detachably connected to the base of the machine. A plate 149 is bent at one edge, as at 150 (see Fig. 11) to surround the rock shaft 147 to clamp the same and turn with the rock shaft in its rocking movement. The member 149 is flanged as at 151 to receive a scale or index plate 152, which may be covered by a transparent plate 153 of celluloid or like material. The space between the flanges 151 provides a sight opening which exposes the tabulator indices 113 on the plate 152. These indices in the present instance read from left to right in the natural order of the reading on the work sheet and are as follows:—"1", "2", "3", "4", "5", "6", "7", "8", "9", "10". That is to say, assuming that there are ten columns on the work sheet, if these columns be numbered progressively from left to right in the natural order of their reading, the ten numerical indices "1", "2", "3", "4", "5", "6", "7", "8", "9", "10", on the scale plate will correspond in their order of reading with the headings on the different columns on the work sheet. It should be understood, however, that any suitable tabulator indices may be employed. The construction is such that the scale plate 152 and cover plate 153 may be removed longitudinally from beneath the flanges 151 and another scale plate bearing different indices may be inserted in place with the cover plate 153 overlying the same.

Arranged beneath the plate 149, when the latter is in the position shown in Fig. 11, is a container 154 which receives an index or scale plate 155 having denominational indices 156 thereon. These indices in the present instance comprise the index numerals "100,000", "10,000", "1,000", ",", "100", "10", "1", ".", which read from left to right in the natural order of the reading of denominationally positioned characters on the work sheet. The index plate 155 may also be provided with a transparent cover plate of celluloid or like material 157.

In the operation of the machine it will be assumed that the index carrier 149 is in the position shown in Fig. 11 so that the index numerals 113 thereon are exposed to the view of the operator. At this time the member 149 overlies the indices 156 so that the latter cannot be observed by the operator. An actuation of a key 80 for column selection, and the selection of which key is aided by the index 113 in register therewith, will result in effecting a rotative movement of the ratchet member 133 during the return movement of the actuated key to normal position. The effect of this movement is to produce a one-sixth revolution of the shaft 128, thereby bringing the apex or elevated portion 140 on the cam 139 into operative position. The effect of this movement of the cam is to elevate the lever 142, thereby transmitting motion through the crank pin 146 to turn the rock shaft 147 from the full to the dotted line position shown in Fig. 10. This results in exposing the denominational indices 156 on the lowermost scale plate. The first eight keys, counting from right to left, therefore have denominational indices exposed in register therewith for the use of such keys as denominational selecting keys. The parts remain in the positions indicated until the next actuation of a key 80, which keys at this time are effective as denominational selecting keys, and during the return movement of such actuated key to normal position the ratchet bar will be given a turn of one-sixth of a revolution, thereby again bringing the low portion of the cam 139 in coöperation with the lever 142, lowering the same and allowing the member 149 to return to the position shown in Figs. 2 and 11, where the column selecting indices 113 are again exposed to the view of the operator. It will be understood, therefore, that the construction is such that the operation of the tabulator key 80 is effective to alternately expose the column selecting indices 113 and the denominational indices 156 in register with the tabulating keys in order to aid in the alternative use of these keys for denominational and column selection. Moreover, it will be understood that the same pawl and ratchet mechanism 76—134, which is effective under the operation of the tabulator keys to automatically render the tabulator mechanism operative as a column selector and denominational selector, is also effective to automatically control the tabulator indicating mechanism to alternately expose the column selecting and denominational selecting indices in register with the keys.

From an inspection of Fig. 1 it will be understood that there is considerable lost motion between the rear edges of the key controlled stop 73 and the universal release bar 93, and that there is also considerable lost motion between the carriage release shoe 109 and the feed rack 26 so that the release of the carriage is not effected until the last portion of the movement of the key controlled stop into operative position. By reason of this fact I am enabled to actuate any of the tabulator keys 80 a distance less than that required to effect a release of the carriage, but sufficient nevertheless to bring about an engagement of the pawls 76 on the actuated stop with the ratchet bar 133. A release of the key after such an actuation will enable the pawls 76 to rotate the cams 136 and 139 to bring about a shifting of the mechanism from the position to which it has been set to a position where it will be effective for the other class of tabulating work. For example, if the parts have been set for denominational work an actuation of one of the keys in the manner described will be effective to set the parts for column selection. If, on the other hand, the parts have been set for column selection and it is desired to set them for denominational selection, then an actuation of a key in the manner described is effective to bring about this result. The construction and arrangement of the parts is such that the operator may readily effect an actuation of the controlling mechanism by the operation of a key 80 without releasing the carriage by reason of the fact that an additional load is placed on the key at the last portion of the stroke, due to the additional resistance required to effect a release of the carriage and this is readily felt by the operator in actuating a key. It will be understood, therefore, that while an actuation of any of the tabulator keys for a tabulating operation is effective to automatically bring about a coupling up of the stop carrying bar with the carriage or a disconnection of said bar from said carriage, as the case may be, and is also effective to shift the scale carrying member 149, yet these operations when desired may be effected independently of the tabulating operation. If, for example, the carriage should be returned to the right, preliminary to effecting a tabulating operation, and at this time for any reason the parts should be set to expose the denominational indices instead of the column selecting indices, the operator will at once observe this condition and a light pressure on any key 80, short of that required to effect a tabulating operation, will be effective to reset the parts for column selecting instead of denominational selecting work. The operator may then proceed to effect a column selection and the next operation of a key is effective for denominational selection within the previously selected columnar field. It will be understood, therefore, that each of the keys 80 is not only effective to automatically control the mechanism for column and denominational selection, but is likewise operative at will to vary the mechanism from one character of selection to the other, and is also effective to vary the tabulator indicating mechanism accordingly.

It will be understood that the chain driven stop 70 moves progressively from left to right past the successive key controlled stops 73 as the carriage moves from right to left. It will be understood, therefore, that if the operator should through a mistake actuate a previously operated key for column selection the carriage will run throughout its length without being arrested because the chain driven stop 70 has passed such key actuated stop. For example, if the operator should actuate the fifth key 80 for column selection, the same being indicated by the index numeral "5", and at the next column selecting operation should actuate the fourth key, indicated by the index numeral "4", then the carriage will move throughout its length of travel, thereby notifying the operator that a wrong column has been selected.

The purpose in forming the beveled faces 127ᵃ on the engaging devices 127 is to provide against injury to the mechanism through an improper actuation thereof. If, for example, the stop carrying bar 114 is operatively connected to the chain through the stop 69, as indicated in Figs. 5 and 7, for denominational work, and the operator should fail to denominationally select and should attempt to return the carriage to the right to begin a new line, this will result in the following operation of the parts: The movement of the carriage to the right will cause the stop 69 to be moved to the left. When the stop 69 in this movement engages the beveled face on the first of the engaging members 127, it will cause the stop carrying bar 114 and its supporting bar 115 to be cammed upwardly out of the path of the traveling stop 69 and as each successive engaging device 127 is reached, this same camming action will be effected to move the stop carrying bar 114 upwardly and away from the stop 69 so as not to block the movement of the stop 169 in its movement at this time from right to left, and no injury can result to the construction from a violent movement of the carriage to the right, even if the operator should forget to denominationally select before returning the carriage to begin a new line.

From the foregoing description it will be understood that the stops 126 are arranged at fixed unvariable distances apart; that each of these stops is coöperative with but one of the stops 73; that the stops 126 are automatically moved alternately into and out of operative position or into and out of a position where the stops 73, when projected, may coöperate therewith; that these same movements of the stops 126 result in effecting an operative connection or disconnection between the stops 126 and the carriage, to cause the stops to move in unison with the carriage or to enable the carriage to travel independently thereof; that the stops 73 are fixed against relative adjustment and are spaced apart at column determining positions, or to accord to columnar fields to be filled in; that each stop 73 has an unvariable path of movement for a single given extent and that all of these stops move a uniform distance; that the stop carrying bar 114 and the stops 126 carried thereby remain at rest during the ordinary step-by-step feed of the carriage and during the column selecting operation; that the bar 114 and the stops 126 move in unison with the carriage only during the denominational selection and after columnar selection has been effected; and that in this movement of the bar 114 it moves to any one of a series of positions, which positions correspond to a series of adjacent letter space positions of the carriage.

While I have described with considerable detail one form or embodiment of my invention it should be understood that various changes may be made in the construction without departing from the spirit of my invention, and that parts of the structure may be employed without others.

What I claim as new and desire to secure by Letters Patent, is:—

1. In a typewriting machine, the combination of a power driven carriage, tabulator mechanism for effecting an arrest of the carriage, and controlling means in addition to said tabulator mechanism and coöperative therewith in the ordinary operation thereof to render said tabulator mechanism necessarily operative alternately as a column selector and denominational selector.

2. In a typewriting machine, the combination of a power driven carriage, tabulator mechanism for effecting an arrest of the carriage, and automatically operating controlling means in addition to said tabulator mechanism and by which it is necessarily operative alternately as a column selector and denominational selector.

3. In a typewriting machine, the combination of a power driven carriage, key controlled tabulator mechanism for effecting an arrest of the carriage, and controlling means in addition to said tabulator mechanism and by which in the ordinary operation of said tabulator mechanism a key thereof is rendered necessarily operative at one time as a column selecting key and at another time as a denominational selecting key.

4. In a typewriting machine, the combination of a power driven carriage, a key controlled tabulator stop, coöperative stops, and additional automatically operating controlling means for bringing first one and then another of said coöperative stops and said key controlled stop into coöperative relation on successive actuations of said key controlled stop.

5. In a typewriting machine, the combination of a power driven carriage, a key controlled tabulator stop, a coöperative stop, a second coöperative stop, and additional automatically actuated means by which one of said coöperative stops is moved alternately into and out of a position where it will co-act with said key controlled stop when the latter is projected to operative position.

6. In a typewriting machine, the combination of a power driven carriage; tabulating mechanism comprising key controlled denominational arresting means; and additional controlling means by which said denominational arresting means is rendered inoperative as such at alternate actuations of the tabulating mechanism.

7. In a typewriting machine, the combination of a power driven carriage; tabulator mechanism comprising a series of stops, a second series of key controlled stops coöperative with said first mentioned stops; and additional automatically operating controlling means by which said first mentioned series of stops is rendered inoperative for coöperation with said key controlled stops at alternate actuations of keys of said key controlled stops.

8. In a typewriting machine, the combination of a power driven carriage, column and denominational selecting tabulating mechanism for effecting an arrest of the carriage, and additional automatically operating controlling means controlled by the actuation of the tabulating mechanism and by which means the tabulating mechanism in the ordinary operation thereof is rendered necessarily operative alternately as a column selector and as a denominational selector.

9. In a typewriting machine, the combination of a power driven carriage; tabulating mechanism including keys; and automatically operating controlling means in addition to said tabulating mechanism for rendering the tabulating mechanism alternately operative by the same keys only to obtain column selection and only to obtain denominational selection.

10. In a typewriting machine, the combination of a power driven carriage; tabulating mechanism including keys; and automatically operating controlling means in addition to said tabulating mechanism, said controlling means being controlled by the tabulating keys and operative to render the tabulating mechanism alternately operative by the same keys only to obtain column selection and only to obtain denominational selection.

11. In a typewriting machine, the combination of a power driven carriage, key controlled column and denominational selecting tabulating mechanism, and additional automatically operating controlling means by which said tabulating mechanism is rendered ineffective or inoperative for denominational selection at every other actuation of the tabulating mechanism.

12. In a typewriting machine, the combination of a power driven carriage, key controlled column and denominational selecting tabulating mechanism, and additional automatically operating controlling means controlled by the actuation of the keys of the tabulating mechanism and by which said tabulating mechanism is rendered ineffective or inoperative for denominational selection at every other actuation of the tabulating mechanism.

13. In a typewriting machine, the combination of a power driven carriage, two stop carriers adapted to move in unison with the carriage, a stop carried by each of said carriers, key controlled arresting means coöperative with said stops to arrest the carriage, and additional automatically operating controlling means by which said arresting means are rendered coöperative alternately first with one and then with the other of said stops.

14. In a typewriting machine, the combination of a power driven carriage, two stop carriers adapted to move in unison with the carriage, a stop carried by each of said carriers, a key controlled stop, and additional controlling means by which said key controlled stop in the ordinary operation thereof is rendered necessarily coöperative first with one and then with the other of said two first mentioned stops at successive operations of the tabulating mechanism by said key controlled stop.

15. In a typewriting machine, the combination of a carriage; and tabulating mechanism including two stops that are adapted to travel in unison with the carriage and which have different paths of movement, a key controlled stop that has an unvariable path of movement for a single given extent into and out of operative position, and means by which an arrest of the carriage may be effected through the coöperation of said key controlled stop with one or the other of said traveling stops.

16. In a typewriting machine, the combination of a carriage; and tabulating mechanism including two stops that are adapted to travel in unison with the carriage and which have different paths of movement, a key controlled stop that has an unvariable path of movement for a single given extent into and out of operative position, and automatically operating means for rendering said key controlled stop coöperative with first one and then with the other of said traveling stops.

17. In a typewriting machine, the combination of a carriage; and column and denominational selecting tabulating mechanism including two stops that are adapted to travel in unison with the carriage and which have different paths of movement, a key controlled stop that has an unvariable path of movement for a single given extent into and out of operative position, and automatically operating means for rendering said key controlled stop when projected coöperative first with one of said traveling stops to select a columnar position of arrest and then coöperative with the other of said traveling stops to select a denominational position of arrest within the selected columnar field.

18. In a typewriting machine, the combination of a power driven carriage; tabulator mechanism comprising a series of keys; and automatically operating controlling means in addition to said tabulator mechanism and by which said keys are alternately operable as column selecting and as denominational selecting keys.

19. In a typewriting machine, the combination of a power driven carriage; tabulator mechanism comprising a series of keys; and controlling means in addition to said tabulator mechanism and controlled by said keys for rendering them operative alternately as column selecting keys and as denominational selecting keys.

20. In a typewriting machine, the combination of a power driven carriage; and tabulator mechanism comprising a key having a single path of movement; and controlling means in addition to said tabulator mechanism and operative in the ordinary operation of the tabulator mechanism for causing an arrest of the carriage in a given columnar field at one actuation of said key and for causing an arrest of the carriage at a given denominational position within that field at the next actuation of said key.

21. In a typewriting machine, the combination of a power driven carriage; tabulator mechanism comprising a key having a single path of movement; and controlling means in addition to said tabulator mechanism, said controlling means being controlled by said key for causing an arrest of the carriage in a given columnar field at one actuation of the key and for causing an arrest of the carriage at a given denominational position within that field at the next actuation of the key.

22. In a typewriting machine, the combination of a power driven carriage; tabulator mechanism comprising a key; and controlling means in addition to said tabulator mechanism for causing an arrest of the carriage in a given columnar field at one actuation of the key and for causing an arrest of the carriage at a given denominational position within that field at the next actuation of the tabulator mechanism effected by said key, said controlling means including automatically operating means by which said key is rendered operative at one time as a column key and at another time as a denominational key.

23. In a typewriting machine, the combination of a power driven carriage; tabulator mechanism comprising a series of tabulator keys each having a single path of movement; and controlling means in addition to said tabulator mechanism and controlled thereby for causing an arrest of the carriage in a given columnar field at one actuation of a tabulator key as determined by the particular key actuated and for causing an arrest of the carriage in a denominational position within the selected columnar field at the next actuation of any of said tabulator keys, the particular key operated at the second actuation of the keys determining the denominational position of arrest.

24. In a typewriting machine, the combination of a power driven carriage; tabulator mechanism comprising a series of tabulator keys; and controlling means in addition to said tabulator mechanism for causing an arrest of the carriage in a given columnar field at one actuation of a key as determined by the particular key actuated and for causing an arrest of the carriage in a denominational position within the selected columnar field at the next actuation of any of said keys, the particular key operated at the second actuation of the keys determining the denominational position of arrest, said controlling means including automatically actuated means by which said keys are rendered effective alternately as column selecting keys and as denominational selecting keys.

25. In a typewriting machine, the combination of a power driven carriage; tabulator mechanism for selecting the columnar position of arrest and for selecting the denominational position of arrest, said tabulator mechanism comprising a series of key controlled stops each having at all times under the operation of its key an unvariable path of movement for a single given extent, means coöperative with said key controlled stops for effecting a columnar selection, means coöperative with said key controlled stops for effecting a denominational selection, and controlling means in addition to said tabulator mechanism for determining when said key controlled stops shall operate to effect denominational selection.

26. In a typewriting machine, the combination of a power driven carriage; tabulator mechanism for selecting the columnar position of arrest and for selecting the denominational position of arrest, said tabulator mechanism comprising a series of key controlled stops each having at all times under the operation of its key an unvariable path of movement for a single given extent, means coöperative with said key controlled stops for effecting a columnar selection, means coöperative with said key controlled stops for effecting a denominational selection; and controlling means in addition to said tabulator mechanism and by which the keys of said key controlled stops are operative at one time as column selecting keys and at another time as denominational selecting keys.

27. In a typewriting machine, the combination of a power driven carriage; tabulator mechanism for selecting the columnar position of arrest and for selecting the denominational position of arrest, said tabulator mechanism comprising a series of key controlled stops, means coöperative with said key controlled stops for effecting a columnar selection, means coöperative with said key controlled stops for effecting a denominational selection; and automatically operating controlling means in addition to said tabulator mechanism for rendering the keys of said key controlled stops alternately operative as column selecting keys and as denominational selecting keys.

28. In a typewriting machine, the combination of a power driven carriage; tabulator mechanism for selecting the columnar position of arrest and for selecting the denominational position of arrest, said tabulator mechanism comprising a series of key controlled stops, means coöperative with said key controlled stops for effecting a columnar selection, means coöperative with said key controlled stops for effecting a denominational selection; and automatically operating controlling means controlled by the keys of said key controlled stops for rendering said keys alternately operative as column selecting keys and as denominational selecting keys, said controlling means being in addition to said tabulator mechanism.

29. In a typewriting machine, the combination of a carriage; and tabulator mechanism for selecting the columnar position of arrest and for selecting the denominational position of arrest, said tabulator mechanism comprising a series of key controlled stops each having an unvariable path of movement for a single given extent at each actuation of its key, a single traveling stop with which said key controlled stops are coöperative to select the columnar position of arrest of the carriage, and a second series of stops with which said key controlled stops are likewise coöperative to select the denominational position of arrest.

30. In a typewriting machine, the combination of a carriage; and tabulator mechanism for selecting the columnar position of arrest and for selecting the denominational position of arrest, said tabulator mechanism comprising a series of key controlled stops each having an unvariable path of movement for a single given extent at each actuation of its key, a single traveling stop with which said key controlled stops are coöperative to select the columnar position of arrest of the carriage, a second series of stops with which said key controlled stops are likewise coöperative to select the denominational position of arrest, and means by which said second series of stops may be rendered effective or ineffective to coöperate with said key controlled stops.

31. In a typewriting machine, the combination of a carriage; and tabulator mechanism for selecting the columnar position of arrest and for selecting the denominational position of arrest, said tabulator mechanism comprising a series of key controlled stops, a single traveling stop with which said key controlled stops are coöperative to select the columnar position of arrest of the carriage, a second series of stops with which said key controlled stops are likewise coöperative to select the denominational position of arrest, and automatically operating means by which said second series of stops may be rendered alternately effective and ineffective for coöperation with said key controlled stops when the latter are projected.

32. In a typewriting machine, the combination of a carriage; and tabulator mechanism for selecting the columnar position of arrest and for selecting the denominational position of arrest, said tabulator mechanism comprising a series of key controlled stops each having an unvariable path of movement for a single given extent, a single traveling stop with which said key controlled stops are coöperative to select the columnar position of arrest of the carriage, a second series of stops with which said key controlled stops are likewise coöperative to select the denominational position of arrest, and automatically operating means controlled by the keys of said key controlled stops for rendering the said second series of stops alternately effective and ineffective for coöperation with said key controlled stops when the latter are projected.

33. In a typewriting machine, the combination of a carriage; and tabulator mechanism for selecting the columnar position of arrest and for selecting the denominational position of arrest, said tabulator mechanism comprising a series of key controlled stops spaced apart to accord to the spacing of the columnar fields to be filled in, means coöperative with said key controlled stops for effecting a columnar selection, and means likewise coöperative with said key controlled stops for effecting a denominational selection.

34. In a typewriting machine, the combination of a carriage; and tabulator mechanism for selecting the columnar position of arrest and for selecting the denominational position of arrest, said tabulator mechanism comprising a series of key controlled stops each having an unvariable path of movement for a single given extent, said key controlled stops being spaced apart to accord to the spacing of the columnar fields to be filled in, means coöperative with said key controlled stops for effecting a columnar selection, and means likewise coöperative with said key controlled stops for effecting a denominational selection.

35. In a typewriting machine, the combination of a carriage; and tabulator mechanism for selecting the columnar position of arrest and for selecting the denominational position of arrest, said tabulator mechanism comprising a series of key controlled stops spaced apart to accord to the spacing of the columnar fields to be filled in, means coöperative with said key controlled stops for effecting a columnar selection, means likewise coöperative with said key controlled stops for effecting a denominational selection, and means by which the means which coöperate with the key controlled stops for denominational selection are rendered ineffective.

36. In a typewriting machine, the combination of a carriage; and tabulator mechanism for selecting the columnar position of arrest and for selecting the denominational position of arrest, said tabulator mechanism comprising a series of key controlled stops spaced apart to accord to the spacing of the columnar fields to be filled in, means coöperative with said key controlled stops for effecting a columnar selection, means likewise coöperative with said key controlled stops for effecting a denominational selection, and automatically operating means for rendering the keys of said key controlled stops operative at one time as column selecting keys and at another time as denominational selecting keys.

37. In a typewriting machine, the combination of a carriage; and tabulator mechanism for selecting the columnar position of arrest and for selecting the denominational position of arrest, said tabulator mechanism comprising a series of key controlled stops each having an unvariable path of movement for a single given extent, said key controlled stops being spaced apart to accord to the spacing of the columnar fields to be filled in, means coöperative with said key controlled stops for effecting a columnar selection, means likewise coöperative with said key controlled stops for effecting a denominational selection, and automatically operating means controlled by the keys of said key controlled stops for rendering said keys alternately operative as column selecting keys and as denominational selecting keys.

38. In a typewriting machine, the combination of a power driven carriage, tabulator mechanism comprising a key controlled stop having a single path of movement, a stop coöperative with said key controlled stop to effect an arrest of the carriage in the columnar field, a second stop also coöperative with said key controlled stop to arrest the carriage at a given denominational position within the columnar field determined by the coöperation of the key controlled stop and the first mentioned coöperative stop; and automatically operating controlling means in addition to said tabulator mechanism for rendering said key controlled stop coöperative first with one and then with the other of said coöperative stops.

39. In a typewriting machine, the combination of a power driven carriage; tabulator mechanism comprising a key controlled stop having a single path of movement, a stop coöperative with said key controlled stop to effect an arrest of the carriage in the columnar field, a second stop also coöperative with said key controlled stop to arrest the carriage at a given denominational position within the columnar field determined by the coöperation of the key controlled stop and the first mentioned coöperative stop; and additional automatically operating controlling means for throwing said second coöperative stop into and out of operation.

40. In a typewriting machine, the combination of a power driven carriage; tabulator mechanism comprising a key controlled stop having a single path of movement, a stop coöperative with said key controlled stop to effect an arrest of the carriage in a given columnar field, a second stop also coöperative with said key controlled stop to arrest the carriage at a given denominational position within the columnar field determined by the coöperation of the key controlled stop and the first mentioned coöperative stop; and additional mechanically controlled means for operatively connecting said second coöperative stop to travel in unison with the carriage or for disconnecting it from the carriage.

41. In a typewriting machine, the combination of a power driven carriage; tabulator mechanism comprising a key controlled stop having a single path of movement, a stop coöperative with said key controlled stop to effect an arrest of the carriage in a given columnar field, a second stop also coöperative with said key controlled stop to arrest the carriage at a given denominational position within the columnar field determined by the coöperation of the key controlled stop and the first mentioned coöperative stop; and additional automatically operating means for moving said second coöperative stop into and out of a position where the key controlled stop may be moved into coöperative relation therewith.

42. In a typewriting machine, the combination of a carriage; and tabulator mechanism comprising a key controlled stop having a single extent of movement in a single path at each actuation of said key, a stop coöperative with said key controlled stop to effect an arrest of the carriage in a given columnar field, a second stop also coöperative with said key controlled stop to arrest the carriage at a given denominational position within the columnar field determined by the coöperation of the key controlled stop and the first mentioned coöperative stop, and automatically operated means controlled by the actuation of the key of said key controlled stop for alternately rendering said second coöperative stop operative and inoperative.

43. In a typewriting machine, the combination of a carriage; and tabulator mechanism comprising a key controlled stop having a single path of movement, a stop coöperative with said key controlled stop to effect an arrest of the carriage in a given columnar field, a second stop also coöperative with said key controlled stop to arrest the carriage at a given denominational position within the columnar field determined by the coöperation of the key controlled stop and the first mentioned coöperative stop, and automatically operated means controlled by the actuation of the key of said key controlled stop for moving said second coöperative stop into and out of a position where the projected key controlled stop may co-act therewith and for simultaneously operatively connecting or disconnecting the said second coöperative stop and the carriage.

44. In a typewriting machine, the combination of a carriage, a series of key controlled stops fixed against relative adjustment and spaced apart at column determining positions, and means by which each of said key controlled stops is effective to control a denominational as well as a columnar position of arrest of the carriage.

45. In a typewriting machine, the combination of a carriage, a series of key controlled stops spaced apart at column determining positions, and means by which each of said key controlled stops is effective to control alternately a columnar and a denominational position of arrest of the carriage, said means including automatically operating means for rendering the keys of said key controlled stops alternately operative as column selecting keys and as denominational selecting keys.

46. In a typewriting machine, the combination of a carriage, a series of key controlled tabulator stops spaced apart at column determining positions, a traveling stop coöperative with said key controlled stops to provide for column selection, and means including a series of stops also coöperative with said key controlled stops but to provide a denominational selection.

47. In a typewriting machine, the combination of a carriage, a series of key controlled tabulator stops, a traveling stop coöperative with said key controlled stops to provide for column selection, a series of traveling stops also coöperative with said key controlled stops but to provide a denominational selection, and automatically operating means for rendering each key controlled stop when successively projected coöperative first with one and then with another of said traveling stops.

48. In a typewriting machine, the combination of a carriage, a series of key controlled tabulator stops, a traveling stop coöperative with said key controlled stops to provide for column selection, a series of traveling stops also coöperative with said key controlled stops but to provide a denominational selection, and means for rendering said series of traveling stops inoperative to co-act with the key controlled stops.

49. In a typewriting machine, the combination of a carriage, a series of key controlled tabulator stops, a traveling stop coöperative with said key controlled stops to provide for column selection, a series of traveling stops also coöperative with said key controlled stops but to provide denominational selection, and automatically operating means for rendering said series of traveling stops inoperative to co-act with said key controlled stops at alternate tabulating operations.

50. In a typewriting machine, the combination of a carriage, a series of key controlled tabulator stops, a traveling stop coöperative with said key controlled stops to provide for column selection, a series of traveling stops also coöperative with said key controlled stops but to provide a denominational selection, and mechanically operated means for operatively connecting said series of traveling stops to travel in unison with the carriage and for disconnecting such stops from the carriage.

51. In a typewriting machine, the combination of a carriage, a series of key controlled tabulator stops, a traveling stop coöperative with said key controlled stops to provide for column selection, a series of traveling stops also coöperative with said key controlled stops but to provide a denominational selection, and automatically operating means for alternately operatively connecting said series of traveling stops to travel with the carriage and disconnecting such stops from the carriage so that the keys of said key controlled stops are operative alternately as column selecting keys and as denominational selecting keys.

52. In a typewriting machine, the combination of a carriage, a series of key controlled tabulator stops, a traveling stop coöperative with said key controlled stops to provide for column selection, a series of traveling stops also coöperative with said key controlled stops but to provide a denominational selection, means for moving the series of traveling stops into operative position where the key controlled stops when projected will co-act therewith and for moving said series of traveling stops out of said operative position, and means controlled by the said movement of the series of traveling stops into and out of operative position for effecting an operative connection and disconnection between the series of traveling stops and the carriage to cause said last mentioned stops to travel in unison with the carriage, or to enable the carriage to travel independently thereof.

53. In a typewriting machine, the combination of a carriage, a series of key controlled tabulator stops, a traveling stop cooperative with said key controlled stops to provide for column selection, a series of traveling stops also cooperative with said key controlled stops but to provide denominational selection, automatically operating means for moving the series of traveling stops into and out of a position where the key controlled stops when projected will cooperate therewith, and means controlled by the movement of said series of traveling stops into said position for operatively connecting said last mentioned stops to travel in unison with the carriage and for disconnecting these stops from the carriage when they are moved out of said position.

54. In a typewriting machine, the combination of a carriage; and tabulator mechanism comprising a stop normally disconnected from the carriage, a cooperative key controlled stop, and automatically operating means for operatively connecting said first mentioned stop to travel in unison with the carriage.

55. In a typewriting machine, the combination of a carriage; and tabulator mechanism comprising a stop normally disconnected from the carriage, a cooperative key controlled stop, and automatically operating means for operatively connecting said first mentioned stop to travel in unison with the carriage; successive actuations of the key of said key controlled stop effecting alternately an operative connection and disconnection between the carriage and said first mentioned stop.

56. In a typewriting machine, the combination of a carriage; and tabulator mechanism comprising a stop normally disconnected from the carriage, a series of key controlled stops movable a uniform distance and each movable in a single path, automatically operating means for operatively connecting said first mentioned stop to travel in unison with the carriage, said automatically operating means being under control of the keys of said key controlled stops, so that successive operations of said keys will alternately effect an operative connection and disconnection between said first mentioned stop and the carriage.

57. In a typewriting machine, the combination of a carriage; and tabulator mechanism comprising a stop carrying bar, automatically operating means for operatively connecting said stop carrying bar to travel in unison with the carriage and for disconnecting said bar from the carriage, and a key controlled cooperative stop.

58. In a typewriting machine, the combination of a carriage; and tabulator mechanism comprising a carrier, a series of stops carried by said carrier, automatically operating means for operatively connecting said carrier to travel in unison with the carriage and for disconnecting the carrier from the carriage, and a series of key controlled tabulator stops.

59. In a typewriting machine, the combination of a carriage; and tabulator mechanism comprising a carrier, a series of stops carried by said carrier, automatically operating means for operatively connecting said carrier to travel in unison with the carriage and for disconnecting the carrier from the carriage, and a series of key controlled tabulator stops, each key controlled stop being cooperative with but one of the stops on the carrier.

60. In a typewriting machine, the combination of a carriage; and tabulator mechanism comprising a series of key controlled tabulator stops, a bar, a series of stops carried by said bar and with which said key controlled stops are cooperative, means for affording a longitudinal movement of said bar for a number of letter spaces corresponding substantially to the number of key controlled stops, and means for effecting an arrest of the carriage through said stop carrying bar and key controlled stops.

61. In a typewriting machine, the combination of a carriage; and tabulator mechanism comprising a series of key controlled tabulator stops, a bar, a series of stops carried by said bar and with which said key controlled stops are cooperative, means for affording a longitudinal movement of said bar for a number of letter spaces corresponding substantially to the number of key controlled stops, and means for moving said bar into and out of a position where the key controlled stops when projected may co-act with the stops on the bar.

62. In a typewriting machine, the combination of a carriage; and tabulator mechanism comprising a series of key controlled tabulator stops, a bar, a series of stops carried by said bar and with which said key controlled stops are cooperative, means for affording a longitudinal movement of said bar for a number of letter spaces corresponding substantially to the number of key controlled stops, and automatically operating means for effecting a transverse movement of said bar.

63. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, and means for operatively connecting said bar to move in unison with the carriage.

64. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, and means controlled by the keys of said key controlled stops for effecting a transverse movement of said bar.

65. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, and automatically operating means for operatively connecting said bar to move in unison with the carriage.

66. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, means for moving said bar transversely, and means controlled by such transverse movement of the bar for operatively connecting the bar to travel in unison with the carriage and for disconnecting the bar from the carriage.

67. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, automatically operating means for moving said bar transversely to effect a movement thereof into and out of a position where the stops thereon are coöperative with a projected key controlled stop, and means controlled by the transverse movement of the bar for operatively connecting the bar to travel in unison with the carriage and for disconnecting the bar from the carriage.

68. In a typewriting machine, the combination of a carriage; and tabulator mechanism comprising a series of key controlled tabulator stops, a bar, a series of stops carried by said bar and which are coöperative with said key controlled stops, means for affording a longitudinal movement of said bar, means for effecting an arrest of the carriage through said stop carrying bar and key controlled stops, and another tabulator stop which travels in unison with the carriage and which also is coöperative with said key controlled stops.

69. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, means for moving said bar into and out of a position where the key controlled stops when projected may co-act with the stops on the bar, and another tabulator stop which travels in unison with the carriage and which also is coöperative with said key controlled stops.

70. In a typewriting machine, the combination of a carriage; and tabulator mechanism comprising a series of key controlled tabulator stops, a bar, a series of stops carried by said bar and which are coöperative with the key controlled stops, means for affording a longitudinal movement of said bar, automatically operating means for effecting a transverse movement of said bar, and another tabulator stop which travels in unison with the carriage and which also is coöperative with said key controlled stops.

71. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, means for operatively connecting said bar to move in unison with the carriage, and another tabulator stop which travels in unison with the carriage and which also is coöperative with said key controlled stops.

72. In a typewriting machine, the combination of a carriage; and tabulator mechanism comprising a series of key controlled tabulator stops, a bar, a series of stops carried by said bar and which are coöperative with said key controlled stops, means for affording a longitudinal movement of said bar, means controlled by the keys of said key controlled stops for effecting a transverse movement of said bar, and another tabulator stop which travels in unison with the carriage and which also is coöperative with said key controlled stops.

73. In a typewriting machine, the combination of a carriage; and tabulator mechanism comprising a series of key controlled tabulator stops, a bar, a series of stops carried by said bar and with which said key controlled stops are coöperative, means for affording a longitudinal movement of said bar for a number of letter spaces corresponding substantially to the number of key controlled stops, means for moving said bar transversely, means controlled by such transverse movement of the bar for operatively connecting the bar to travel in unison with the carriage and for disconnecting the bar from the carriage, and another tabulator stop which travels in unison with the carriage and which also is coöperative with said key controlled stops.

74. In a typewriting machine, the combination of a carriage; and tabulator mechanism comprising a series of key controlled tabulator stops, a bar, a series of stops carried by said bar and which are coöperative with said key controlled stops, means for affording a longitudinal movement of said bar, automatically operating means for moving said bar transversely to effect a movement thereof into and out of a position where the stops thereon are coöperative with a projected key controlled stop, means controlled by the transverse movement of the bar for operatively connecting the bar to travel in unison with the carriage and for disconnecting the bar from the carriage, and another tabulator stop which travels in unison with the carriage and which also is coöperative with said key controlled stops.

75. In a typewriting machine, the combination of a carriage; and tabulating mechanism including denominational selecting means comprising a series of stops constantly maintained at fixed distances apart, each distance being greater than a letter space, means by which the stops may be caused to travel in unison with the carriage or the carriage may be freed to travel independently of said stops, and means for arresting the series of stops and thereby effecting an arrest of the carriage.

76. In a typewriting machine, the combination of a carriage; and tabulating mechanism including denominational selecting means comprising a series of stops constantly maintained at fixed distances apart, means by which the stops may be caused to travel in unison with the carriage or the carriage may be freed to travel independently of said stops, and a series of key controlled stops coöperative with the first mentioned stops to arrest the carriage at different denominational positions.

77. In a typewriting machine, the combination of a carriage; and tabulating mechanism including denominational selecting means comprising a series of stops constantly maintained at fixed distances apart, means by which the stops may be caused to travel in unison with the carriage or the carriage may be freed to travel independently of said stops, and a series of independently operable key controlled stops each controlled by a separate key and coöperative with but a single one of the first mentioned stops, the denominational position of arrest being determined by the particular key which is actuated.

78. In a typewriting machine, the combination of a carriage; and tabulating mechanism including denominational selecting means comprising two series of traveling stops, the working faces of the successive stops of one series being in advance respectively of the working faces of the successive stops of the other series and at successively decreasing distances therefrom, and means coöperative with the stops of one series to arrest them and thereby determine the denominational position of arrest of the carriage.

79. In a typewriting machine, the combination of a carriage; and tabulating mechanism including denominational selecting means comprising two series of traveling stops, the working faces of the successive stops of one series being in advance respectively of the working faces of the successive stops of the other series and at successively decreasing distances therefrom, means by which both series of stops may be caused to travel in unison with the carriage or the carriage may be freed to travel independently of the stops, and means coöperative with the stops of one series to arrest them and thereby determine the denominational position of arrest of the carriage.

80. In a typewriting machine, the combination of a carriage; and tabulating mechanism including denominational selecting means comprising two series of traveling stops, the working faces of the successive stops of one series being in advance respectively of the working faces of the successive stops of the other series and at successively decreasing distances therefrom, means by which both series of stops may be caused to travel in unison with the carriage or the carriage may be freed to travel independently of the stops, and key controlled stops coöperative with the stops of one of said series to arrest the carriage.

81. In a typewriting machine, the combination of a carriage; and tabulator mechanism comprising a bar adapted to slide and carried on the frame of the machine, two series of stops on said bar, the working faces of the successive stops of one series being in advance respectively of the working faces of the successive stops of the other series and at successively decreasing distances therefrom, means for operatively connecting said bar to travel in unison with the carriage and for freeing the carriage to travel independently of said stops, and means coöperating with the stops of one series to arrest the bar and thereby determine the position of arrest of the carriage.

82. In a typewriting machine, the combination of a carriage; and tabulator mechanism comprising a bar adapted to slide and carried on the frame of the machine, two series of stops on said bar, the working faces of the successive stops of one series being in advance respectively of the working faces of the successive stops of the other series and at successively decreasing distances therefrom, means for operatively connecting said bar to travel in unison with the carriage and for freeing the carriage to travel independently of said stops, means coöperative with the stops of one series to arrest the bar and thereby determine the position of arrest of the carriage, and automatically operating means for returning said bar with the stops thereon to normal position when the operative connection between said bar and carriage is released and the carriage is free to travel independently of the stops.

83. In a typewriting machine, the combination of a carriage; and tabulator mechanism comprising a bar adapted to slide and carried on the frame of the machine, two series of stops on said bar, the working faces of the successive stops of one series being in advance respectively of the working faces of the succesive stops of the other series and at successively decreasing distances therefrom, means for operatively connecting said bar to travel in unison with the carriage and for freeing the carriage to travel independently of said stops, a series of key controlled stops spaced at uniform distances apart and coöperative with the stops of one series on the stop bar, each key controlled stop coöperating with but a single stop on the stop bar, and a spring for returning the stop bar to normal position after the bar is released from operative connection with the carriage.

84. In a typewriting machine, the combination of a carriage; and tabulator mechanism comprising a bar adapted to slide and carried on the frame of the machine, two series of stops on said bar, the working faces of the successive stops of one series being in advance respectively of the working faces of the successive stops of the other series and at successively decreasing distances therefrom, means for operatively connecting said bar to travel in unison with the carriage and for freeing the carriage to travel independently of said stops, a series of key controlled stops spaced at uniform distances apart and coöperative with the stops of one series on the stop bar, each key controlled stop coöperating with but a single stop on the stop bar, a spring for returning the stop bar to normal position after the bar is released from operative connection with the carriage, and means for moving the stop carrying bar transversely so that the stops thereon may be held out of coöperative relation with the key controlled stops when the latter are in the projected positions.

85. In a typewriting machine, the combination of a carriage; and tabulator mechanism including denominational selecting means comprising a series of key controlled stops, a carrier, a series of stops carried by said carrier and with which the key controlled stops are coöperative, and means for operatively connecting the carrier to travel in unison with the carriage and for freeing the carrier from operative connection with the carriage so that the latter may travel independently of the carrier.

86. In a typewriting machine, the combination of a carriage; and tabulator mechanism including denominational selecting means comprising a series of key controlled stops spaced apart to accord to the columnar fields to be filled in, a carrier, a series of stops carried by said carrier and with which the key controlled stops are coöperative to arrest the carriage, and means for operatively connecting the carrier to travel in unison with the carriage during a tabulating movement of the carriage and for freeing the carrier from operative connection with the carriage so that the latter may travel independently of the carrier.

87. In a typewriting machine, the combination of a carriage; and tabulator mechanism comprising a member which remains at rest during the ordinary step-by-step feed of the carriage, means by which said member may be operatively connected to move in unison with the carriage during a tabulating operation; and selecting means coöperative with said member to arrest it and thereby determine the denominational position of arrest of the carriage.

88. In a typewriting machine, the combination of a carriage; and tabulator mechanism comprising a member which remains at rest during the ordinary step-by-step feed of the carriage, means by which said member may be operatively connected to move in unison with the carriage during a tabulating operation, a series of keys, and means controlled thereby for arresting said member after various extents of travel as determined by the particular key actuated and thus determine the denominational position of arrest of the carriage.

89. In a typewriting machine, the combination of a carriage; and tabulator mechanism comprising a member which remains at rest during the ordinary step-by-step feed of the carriage, means by which said member may be operatively connected to move in unison with the carriage during a tabulating operation, a series of keys, means controlled thereby for arresting said member after various extents of travel as determined by the particular key actuated and thus determine the denominational position of arrest of the carriage, and a spring for returning said member to normal position after the actuated key has been released.

90. In a typewriting machine, the combination of a carriage; and tabulator mechanism comprising a member which remains at rest during the ordinary step-by-step feed of the carriage, means by which said member may be operatively connected to move in unison with the carriage during a tabulating operation, selecting means coöperative with said member to arrest it and thereby determine the denominational position of arrest of the carriage, and means for rendering said member inoperative to coöperate with said selecting means.

91. In a typewriting machine, the combination of a carriage; and tabulator mechanism comprising a member which remains at rest during the ordinary step-by-step feed of the carriage, means by which said member may be operatively connected to move in unison with the carriage during a tabulating operation, a series of key controlled stops for arresting said member in any one of a plurality of positions which correspond to a plurality of adjacent letter space positions of the carriage to determine the denominational position of arrest of the carriage, and means for rendering said member inoperative to coöperate with said key controlled stops.

92. In a typewriting machine, the combination of a carriage; and tabulator mechanism comprising a member which remains at rest during the ordinary step-by-step feed of the carriage, automatically operating means by which said member is operatively connected to move in unison with the carriage during a tabulating operation, selecting means coöperative with said member to arrest it and thereby determine the position of arrest of the carriage, and automatically operated means for rendering said member inoperative to coöperate with said selecting means.

93. In a typewriting machine, the combination of a carriage; and tabulator mechanism comprising a member which remains at rest during the ordinary step-by-step feed of the carriage, automatically operating means by which said member is operatively connected to move in unison with the carriage during a tabulating operation, a series of keys, means controlled thereby for arresting said member after various extents of travel as determined by the particular key actuated and thus determine the position of arrest of the carriage, and automatically operating means for rendering said member inoperative to coöperate with said key controlled arresting means.

94. In a typewriting machine, the combination of a carriage; and tabulator mechanism comprising a member which remains at rest during the ordinary step-by-step feed of the carriage, automatically operating means by which said member is operatively connected to move in unison with the carriage during a tabulating operation, a series of keys, means controlled thereby for arresting said member after various extents of travel as determined by the particular key actuated and thus determine the position of arrest of the carriage, a spring for returning said member to normal position after the actuated key has been released, and automatically operating means for rendering said member inoperative to coöperate with said key controlled arresting means.

95. In a typewriting machine, the combination of a carriage; and tabulator mechanism comprising a member which remains at rest during the ordinary step-by-step feed of the carriage, automatically operating means by which said member is operatively connected to move in unison with the carriage during a tabulating operation, a series of key controlled stops for arresting said member in any one of a plurality of positions which correspond to a plurality of adjacent letter-space positions of the carriage to determine the denominational position of arrest of the carriage, and automatically operating means for rendering said member inoperative to coöperate with said key controlled stops.

96. In a typewriting machine, the combination of a carriage; and tabulator mechanism comprising column stop means, a member which remains at rest during the ordinary step-by-step feed of the carriage, means by which said member may be operatively connected to move in unison with the carriage, means coöperative with said member to arrest it and thereby determine the denominational position of arrest of the carriage, and means for rendering said member inoperative to coöperate with the selecting means which co-acts therewith so that the column stop means may be effective for column selection.

97. In a typewriting machine, the combination of a carriage; and tabulator mechanism comprising column stop means, a denominational member which remains at rest during the ordinary step-by-step feed of the carriage, means by which said denominational member may be operatively connected to move in unison with the carriage, a series of keys, means controlled thereby for arresting said member after various extents of travel as determined by the particular key actuated and thus determine the denominational position of arrest of the carriage, and means for rendering said member inoperative to coöperate with said key controlled arresting means so that the tabulating mechanism is operative at one time as a column selector and at another time as a denominational selector.

98. In a typewriting machine, the combination of a carriage; and tabulator mechanism comprising column stop means, a denominational member which remains at rest during the ordinary step-by-step feed of the carriage, means by which said denominational member may be operatively connected to move in unison with the carriage, a series of key controlled individually operable stops for arresting said member in any one of a plurality of positions which correspond to a plurality of adjacent letter space positions of the carriage to determine the denominational position of arrest of the carriage, and automatically operating means for rendering said denominational member inoperative to coöperate with said key controlled stops, so that the latter may be used at one time for column selection and at another time for denominational selection.

99. In a typewriting machine, the combination of a carriage; and tabulator mechanism for selecting the denominational position of arrest of the carriage, said mechanism comprising a series of key controlled stops, a contact device movable in unison with the carriage, a second series of stops, and means for effecting an operative connection between said contact device and the second series of stops to cause the latter to travel in unison with the carriage and for effecting a disconnection between such parts to enable the carriage to travel independently of said second series of stops.

100. In a typewriting machine, the combination of a carriage, key controlled tabulator mechanism, tabulator indicating means, and means controlled by the actuation of a key of the tabulator mechanism for varying said indicating means.

101. In a typewriting machine, the combination of a carriage, key controlled tabulator mechanism, tabulator indicating means, and automatically actuated means controlled by the actuation of a key of the tabulator mechanism for alternately exposing first one character of indices and then the other on the indicating means.

102. In a typewriting machine, the combination of a carriage, key controlled tabulator mechanism, a movable tabulator indicating device, and automatically operating means controlled by a key of the tabulator mechanism for shifting said indicating device at each actuation of said key to alternately expose tabulator indices first of one character and then of another.

103. In a typewriting machine, the combination of a carriage, tabulator mechanism including a plurality of tabulator keys, a movable tabulator indicating device with tabulator indices associated with each of said tabulator keys, and automatically operating means controlled by each actuation of any of said tabulator keys for shifting said indicating device to alternately expose tabulator indices first of one character and then of another.

104. In a typewriting machine, the combination of a carriage, tabulator mechanism including a plurality of tabulator keys, a movable tabulator indicating device carrying a series of tabulator indices which are adapted to register with said tabulator keys, and automatically operating means controlled by each actuation of any of said tabulator keys for shifting said indicating device.

105. In a typewriting machine, the combination of a carriage, tabulator mechanism including a plurality of tabulator keys, a movable tabulator indicating device carrying a series of tabulator indices which are adapted to register with said tabulator keys, the movement of said indicating device exposing one side or the other thereof, and automatically operating means for moving said indicating device.

106. In a typewriting machine, the combination of a carriage, tabulator mechanism including a plurality of tabulator keys, a movable tabulator indicating device carrying a series of tabulator indices which are adapted to register with said tabulator keys, and means controlled by said tabulator keys for moving said indicating device to alternately expose first one side and then the other thereof at successive actuations of said tabulator keys.

107. In a typewriting machine, the combination of a carriage, tabulator mechanism including a plurality of tabulator keys, a movable tabulator indicating device carrying a series of tabulator indices which are adapted to register with said tabulator keys, a second series of indices which register with said keys and which are covered by the indicating device when the latter is in a position to expose the indices carried thereby, and automatically operating means for moving said indicating device.

108. In a typewriting machine, the combination of a carriage, tabulator mechanism including a plurality of tabulator keys, a movable tabulator indicating device carrying a series of tabulator indices which are adapted to register with said tabulator keys, a second series of indices which register with said keys and which are covered by the indicating device when the latter is in a position to expose the indices carried thereby, and means controlled by said tabulator keys for moving said indicating device.

109. In a typewriting machine, the combination of a carriage, tabulator mechanism including a plurality of tabulator keys, a movable tabulator indicating device carrying a series of tabulator indices which are adapted to register with said tabulator keys, a second series of indices which register with said keys and which are covered by the indicating device when the latter is in a position to expose the indices carried thereby, and means controlled by each actuation of any of said tabulator keys for moving said indicating device thereby alternately exposing first one series of indices and then the other at successive operation of the tabulator keys.

110. In a typewriting machine, the combination of a carriage, key controlled tabulator mechanism, tabulator indices, and means including pawl and ratchet mechanism for changing said indices.

111. In a typewriting machine, the combination of a carriage, key controlled tabulator mechanism, tabulator indices, and means including automatically operated pawls and ratchet mechanism for changing said indices.

112. In a typewriting machine, the combination of a carriage, key controlled tabulator mechanism, tabulator indices, and means including pawl and ratchet mechanism controlled by the actuation of a key of the tabulator mechanism for changing said indices.

113. In a typewriting machine, the combination of a carriage, tabulator mechanism including a series of tabulator keys, two series of tabulator indicating indices either of which may be exposed in register with the tabulator keys, and means including automatically actuated pawl and ratchet mechanism for exposing one or another series of indices in register with said keys.

114. In a typewriting machine, the combination of a carriage, tabulator mechanism including a plurality of tabulator keys, a movable tabulator indicating device carrying a series of tabulator indices which are adapted to register with said tabulator keys, and automatically operating means controlled by each actuation of any of said tabulator keys for shifting said indicating device, said last mentioned means comprising pawl and ratchet mechanism.

115. In a typewriting machine, the combination of a carriage, tabulator mechanism including a plurality of tabulator keys, a movable tabulator indicating device carrying a series of tabulator indices which are adapted to register with said tabulator keys, and means controlled by said tabulator keys for moving said indicating device to alternately expose first one side and then the other thereof at successive actuations of said tabulator keys, said last mentioned means including pawl and ratchet mechanism controlled by said tabulator keys.

116. In a typewriting machine, the combination of a carriage, tabulator mechanism including a plurality of tabulator keys, a movable tabulator indicating device carrying a series of tabulator indices which are adapted to register with said tabulator keys, a second series of indices which register with said keys and which are covered by the indicating device when the latter is in a position to expose the indices carried thereby, and means controlled by each actuation of any of said tabulator keys for moving said indicating device thereby alternately exposing first one series of indices and then the other at successive operations of the tabulator keys, said last mentioned means comprising a ratchet and a pawl controlled by each tabulator key and coöperative with said ratchet.

117. In a typewriting machine, the combination of a carriage, tabulator mechanism including a plurality of tabulator keys; tabulator indicating means for said keys; and automatically actuated means for changing said indicating means, said last mentioned means comprising a rotative ratchet, and a pawl operated by each of said tabulator keys and coöperative with said rotative ratchet.

118. In a typewriting machine, the combination of a carriage, tabulator mechanism including a plurality of tabulator keys; tabulator indicating means for said keys; and automatically actuated means for changing said indicating means, said last mentioned means comprising a rotative ratchet, an automatically actuated pawl coöperative with said rotative ratchet, and a rotative cam which is rotated by said ratchet.

119. In a typewriting machine, the combination of a carriage, tabulator mechanism including a plurality of tabulator keys; tabulator indicating means for said keys; and automatically actuated means for changing said indicating means, said last mentioned means comprising a rotative ratchet, a pawl operated by each of said tabulator keys and coöperative with said rotative ratchet, and a cam controlled by said rotative ratchet.

120. In a typewriting machine, the combination of a carriage, tabulator mechanism including a plurality of tabulator keys, a movable tabulator indicating device carrying a series of tabulator indices which are adapted to register with said tabulator keys, and automatically operating means controlled by each actuation of any of said tabulator keys for shifting said indicating device, said last mentioned means comprising a rotative ratchet device, and a pawl controlled by each tabulator key, whereby an actuation of each tabulator key is effective to shift the tabulator indicator to change the indices after each actuation of the tabulator to alternately expose first one and then the other series of indices.

121. In a typewriting machine, the combination of a carriage, tabulator mechanism including a plurality of tabulator keys, a movable tabulator indicating device carrying a series of tabulator indices which are adapted to register with said tabulator keys, and automatically operating means controlled by each actuation of any of said tabulator keys for shifting said indicating device, said last mentioned means comprising a rotative ratchet device, a pawl controlled by each tabulator key and coöperative with said rotative ratchet device, a cam operated by said ratchet device, and operative connections between said cam and indicating device and by which cam the movement of said indicating device is controlled.

122. In a typewriting machine, the combination of tabulator-key indicating means, and key controlled means for controlling said indicating means to expose one character of indices or another.

123. In a typewriting machine, the combination of tabulator-key indicating means including two series of indices, and key controlled means for simultaneously exposing all of the indices of one series or the other.

124. In a typewriting machine, the combination of tabulator indicating means, and means operable automatically to expose one character of indices at one time and another character of indices at another time or operable at will to expose one character of indices or another as may be desired.

125. In a typewriting machine, the combination of a carriage, tabulator mechanism including a series of keys, tabulator indicating means for said keys, and means operable automatically to expose one character of indices in register with said keys at one time and another character of indices in registering with said keys at another time or operable at will to expose either character of indices in register with the keys.

126. In a typewriting machine, the combination of a power driven carriage; tabulator mechanism; controlling means in addition to the tabulator mechanism and operative automatically to render the tabulator mechanism effective at one time as a column selector and at another time as a denominational selector, and by which the tabulator mechanism may at will be rendered effective either as a column selector or as a denominational selector as may be desired.

127. In a typewriting machine, the combination of a power driven carriage; tabulator mechanism; controlling means in addition to said tabulator mechanism and operative automatically to render the tabulator mechanism alternately effective as a column selector and as a denominational selector, and by which the tabulator mechanism may at will be rendered effective either as a column selector or as a denominational selector as may be desired.

128. In a typewriting machine the combination of a carriage; tabulator mechanism comprising means by which the tabulator mechanism is operative alternately as a column selector and as a denominational selector; tabulator indicating means; and means for varying said indicating means as the tabulating mechanism is operable as a column selector or as a denominational selector.

129. In a typewriting machine, the combination of a carriage; tabulator mechanism comprising means by which the tabulator mechanism is operative alternately as a column selector and as a denominational selector; tabulator indicating means; and automatically operating means for exposing one or another character of indices by the indicator depending on whether the tabulator mechanism is operable as a column selector or denominational selector.

130. In a typewriting machine, the combination of a carriage; and tabulator mechanism comprising a series of keys, automatically operating means by which said keys are alternately operable as column selecting and as denominational selecting keys; a tabulator indicator; and automatically actuated means for shifting said indicator at each actuation of one of said keys.

131. In a typewriting mechine, the combination of a carriage; and tabulator mechanism comprising a series of keys; automatically operating means by which said keys are alternatively operable as column selecting and as denominational selecting keys; two series of tabulator indices; and automatically operating means for exposing one or the other series of said indices in register with said keys depending on whether the tabulator mechanism is operable as a column selector or as a denominational selector.

132. In a typewriting machine, the combination of a carriage; and tabulator mechanism comprising a series of keys, automatically operating means by which said keys are operable at one time as column selecting and at another time as denominational selecting keys; two series of tabulator indices; and means controlled by said keys for exposing one or the other series of said indices in register with said keys depending on whether the tabulator mechanism is operable as a column selector or as a denominational selector.

133. In a typewriting machine, the combination of a carriage, a key controlled tabulator stop, coöperative stops, automatically operating means for bringing alternately first one and then another of said coöperative stops and said key controlled stop into coöperative relation on successive actuations of said key controlled stop, two tabulator indices, and automatically operating means for exposing first one index and then the other in register with said key at successive actuations of the latter.

134. In a typewriting machine, the combination of a carriage, a key controlled tabulator stop, a coöperative stop, a second coöperative stop, automatically actuated means by which one of said coöperative stops is moved alternately into and out of a position where it will co-act with said key controlled stop when the latter is projected to operative position, two tabulator indices, and automatically operating means for alternately exposing first one index and then the other in register with the key of the key controlled stop as one of the coöperative stops is alternately moved into and out of a position where it will co-act with said key controlled stop.

135. In a typewriting machine, the combination of a carriage; tabluating mechanism comprising key controlled denominational arresting means, and means by which said denominational arresting means is rendered inoperative as such at alternate actuations of a key thereof; tabulator indicating means; and means for shifting said indicating means to expose one index on another in register with a key of said key controlled denominational arresting means.

136. In a typewriting machine, the combination of a carriage; tabulator mechanism comprising a series of stops, a second series of key controlled stops coöperative with said first mentioned stops, and automatically operating means by which said first mentioned series of stops is rendered inoperative for coöperation with said key controlled stops at alternate actuations of a key of said key controlled stops; tabulator indicating means; and means for exposing one or another series of indices of said indicating means in register with the keys of said key controlled stops.

137. In a typewriting machine, the combination of a carriage; tabulator mechanism comprising a series of stops, a second series of key controlled stops coöperative with said first mentioned stops, and automatically operating means by which said first mentioned series of stops is rendered inoperative for coöperation with said key controlled stops at alternate actuations of a key of said key controlled stops; tabulator indicating means; and automatically operating means for controlling said indicating means to alternately expose first one and then another series of indices in register with the keys of said key controlled stops.

Signed at the borough of Manhattan, city of New York, in the county of New York, and State of New York, this 8th day of February, A. D. 1913.

ARTHUR W. SMITH.

Witnesses:
M. F. HANNWEBER,
CHARLES E. SMITH.